US010700751B2

(12) United States Patent
Park et al.

(10) Patent No.: US 10,700,751 B2
(45) Date of Patent: Jun. 30, 2020

(54) METHOD FOR REPORTING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Kijun Kim, Seoul (KR); Haewook Park, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/744,807

(22) Filed: Jan. 16, 2020

(65) Prior Publication Data

US 2020/0153496 A1 May 14, 2020

Related U.S. Application Data

(63) Continuation of application No. 16/418,543, filed on May 21, 2019, now Pat. No. 10,574,325, which is a
(Continued)

(51) Int. Cl.
*H04B 7/06* (2006.01)
*H04W 24/10* (2009.01)
(Continued)

(52) U.S. Cl.
CPC ............ *H04B 7/0626* (2013.01); *H04B 7/04* (2013.01); *H04B 7/06* (2013.01); *H04L 5/00* (2013.01);
(Continued)

(58) Field of Classification Search
CPC .......... H04B 7/0626; H04B 7/04; H04B 7/06; H04L 5/00; H04L 5/0094; H04L 5/0048;
(Continued)

(56) References Cited

U.S. PATENT DOCUMENTS

2014/0133336 A1 5/2014 Park et al.
2015/0124732 A1* 5/2015 Seo .................. H04L 5/0051
370/329

(Continued)

FOREIGN PATENT DOCUMENTS

EP 2645616 A2 10/2013
EP 2677671 A1 12/2013
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.6.0, Jun. 2015, pp. 1-449.
(Continued)

*Primary Examiner* — Kabir A Timory
(74) *Attorney, Agent, or Firm* — Birch, Stewart, Kolasch & Birch, LLP

(57) ABSTRACT

A method for reporting a channel state information (CSI) based on CSI-reference signal (CSI-RS) to a base station (BS) in a wireless communication system, by a user equipment (UE), includes receiving, from the base station, CSI-RS resource configuration information related to a numbering for a plurality of CSI-RS resources through a radio resource control (RRC) signaling, wherein the CSI-RS resource configuration information includes first CSI-RS configuration information and at least one second CSI-RS configuration information; and determining numbers for the
(Continued)

plurality of CSI-RS resources based on the received CSI-RS resource configuration information, wherein a first CSI-RS resource among the plurality of CSI-RS resources corresponds to a first number configured in the first CSI-RS configuration information, and at least one second CSI-RS resource except the first CSI-RS resource among the plurality of CSI-RS resources corresponds to at least one second number configured in the second CSI-RS configuration information.

14 Claims, 23 Drawing Sheets

Related U.S. Application Data continuation of application No. 15/739,929, filed as application No. PCT/KR2016/007448 on Jul. 8, 2016, now Pat. No. 10,320,465.

(60) Provisional application No. 62/190,751, filed on Jul. 10, 2015, provisional application No. 62/343,017, filed on May 30, 2016.

(51) Int. Cl.
*H04L 5/00* (2006.01)
*H04B 7/04* (2017.01)

(52) U.S. Cl.
CPC .......... *H04L 5/0048* (2013.01); *H04L 5/0057* (2013.01); *H04L 5/0094* (2013.01); *H04W 24/10* (2013.01); *H04L 5/0023* (2013.01); *H04L 5/0035* (2013.01); *H04L 5/0039* (2013.01)

(58) Field of Classification Search
CPC ... H04L 5/0057; H04L 5/0023; H04L 5/0039; H04L 5/0035; H04W 24/10
See application file for complete search history.

(56) References Cited

U.S. PATENT DOCUMENTS

2015/0146676 A1   5/2015   Onggosanusi et al.
2016/0218778 A1   7/2016   Ng et al.

FOREIGN PATENT DOCUMENTS

| JP | 2015-70335 A | 4/2015 |
| WO | WO 2014/042422 A2 | 3/2014 |
| WO | WO 2014/052806 A1 | 4/2014 |
| WO | WO 2014/123340 A1 | 8/2014 |
| WO | WO 2014/129716 A1 | 8/2014 |
| WO | WO 2015/047333 A1 | 4/2015 |

OTHER PUBLICATIONS

Alcatel-Lucent et al., "Overview of CSI-RS and Feedback Enhancement Candidates", R1-152659, 3GPP TSG RAN WG1 Meeting #81, Fukuoka, Japan, May 25-29, 2015, Total 5 pages, See section 2-3.
ETRI, "CSI-RS enhancements to support more than 8 CSI-RS ports", R1-153007, 3GPP TSG RAN WG1 Meeting #81, Fukuoka, Japan. May 25-29, 2015. Total 5 pages, See pp. 1-4.
Huawei et al. "Proposals for CSI-RS and CSI feedback in TR", R1-152478, 3GPP TSG RAN WG1 Meeting #81, Fukuoka, Japan, May 25-29, 2015, Total 5 pages, See sections 2-4.
SAMSUNG, "Discussion on CSI-RS Enhancements for FD-MIMO", 3GPP TSG RAN WG1 Meeting #80bis, R1-151646, Belgrade, Servia, Apr. 20-24, 2015 (Downloaded by EPO Apr. 10, 2015), 6 pages.

* cited by examiner

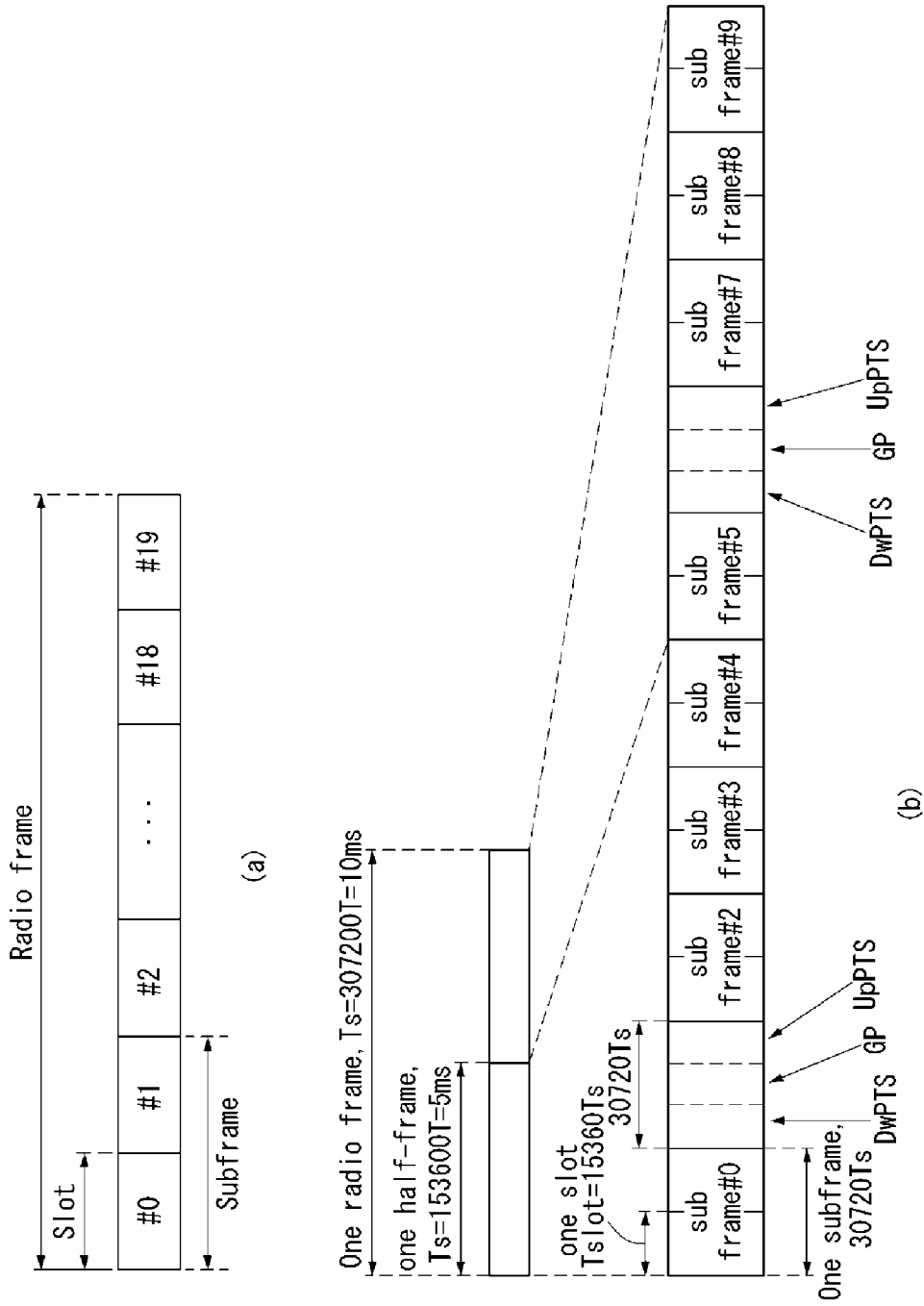
[Figure 1]

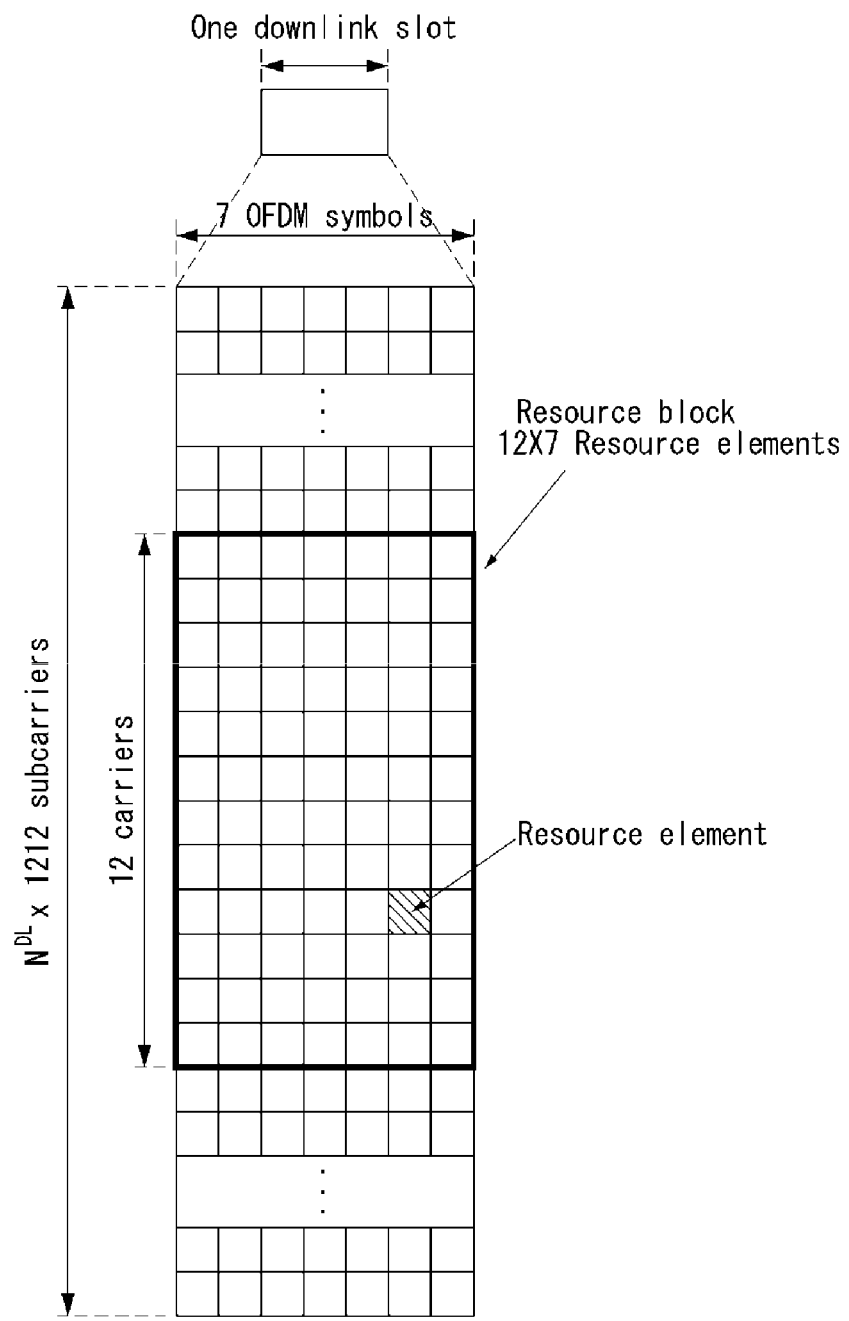

[Figure 3]
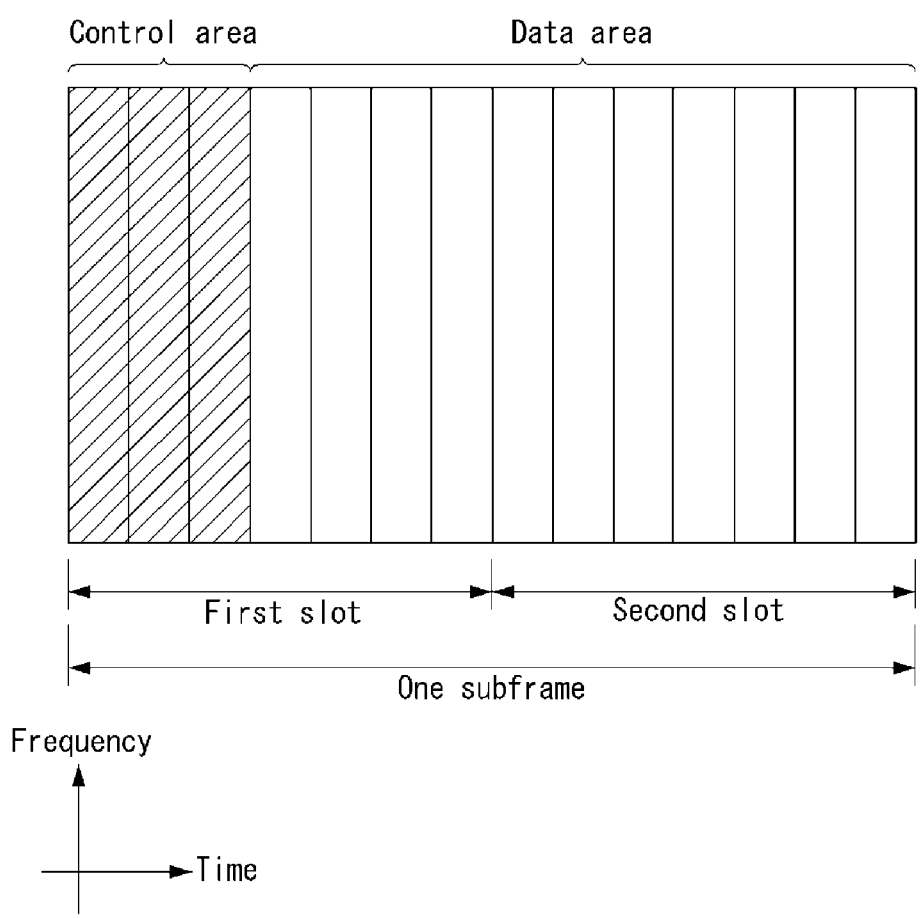

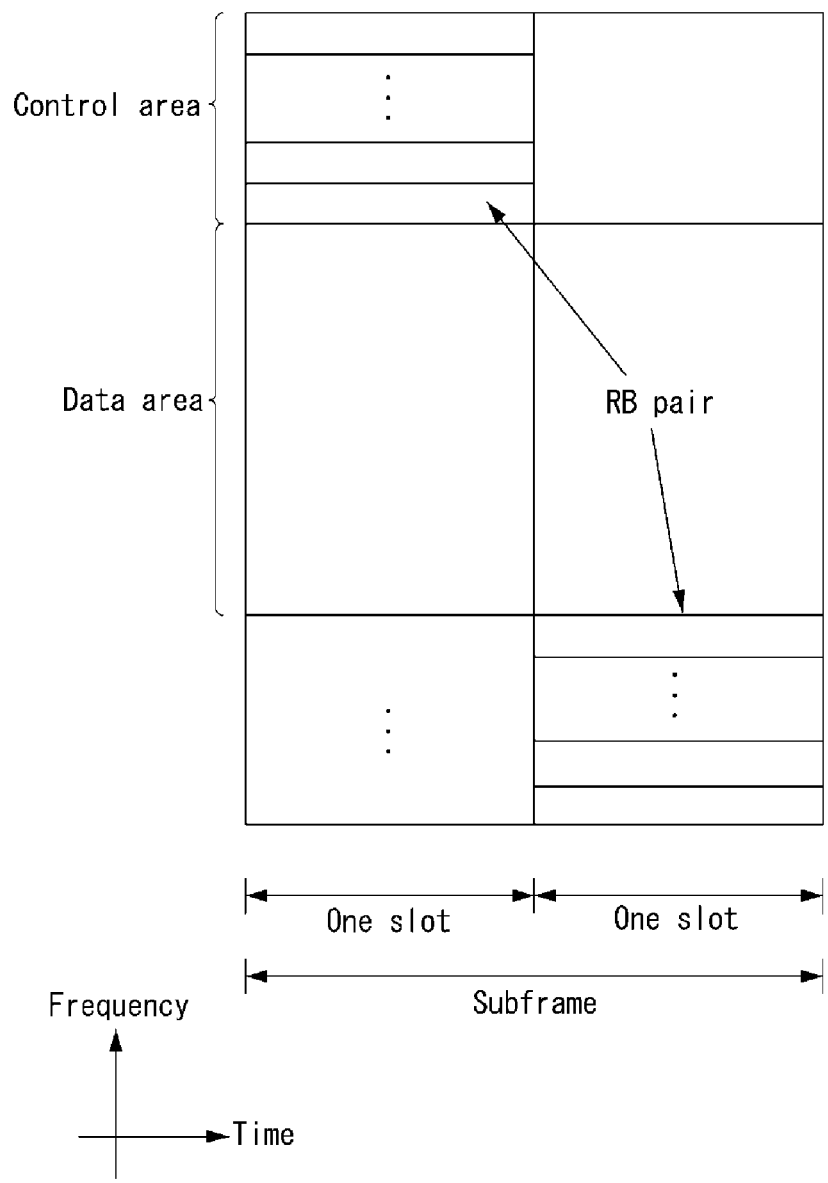
[Figure 4]

【Figure 5】
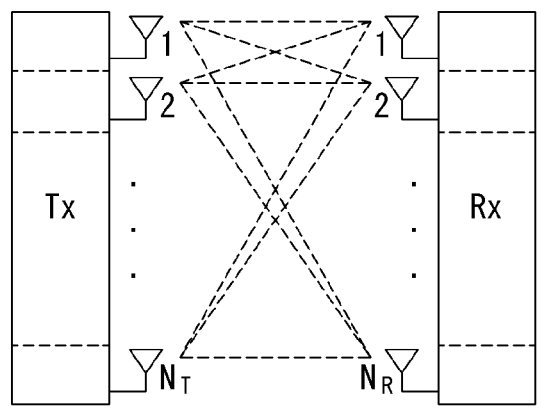
【Figure 6】
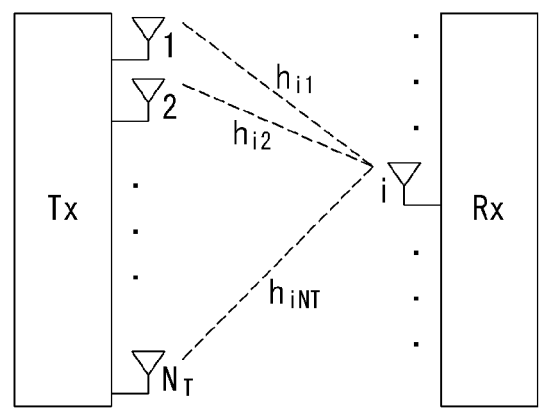

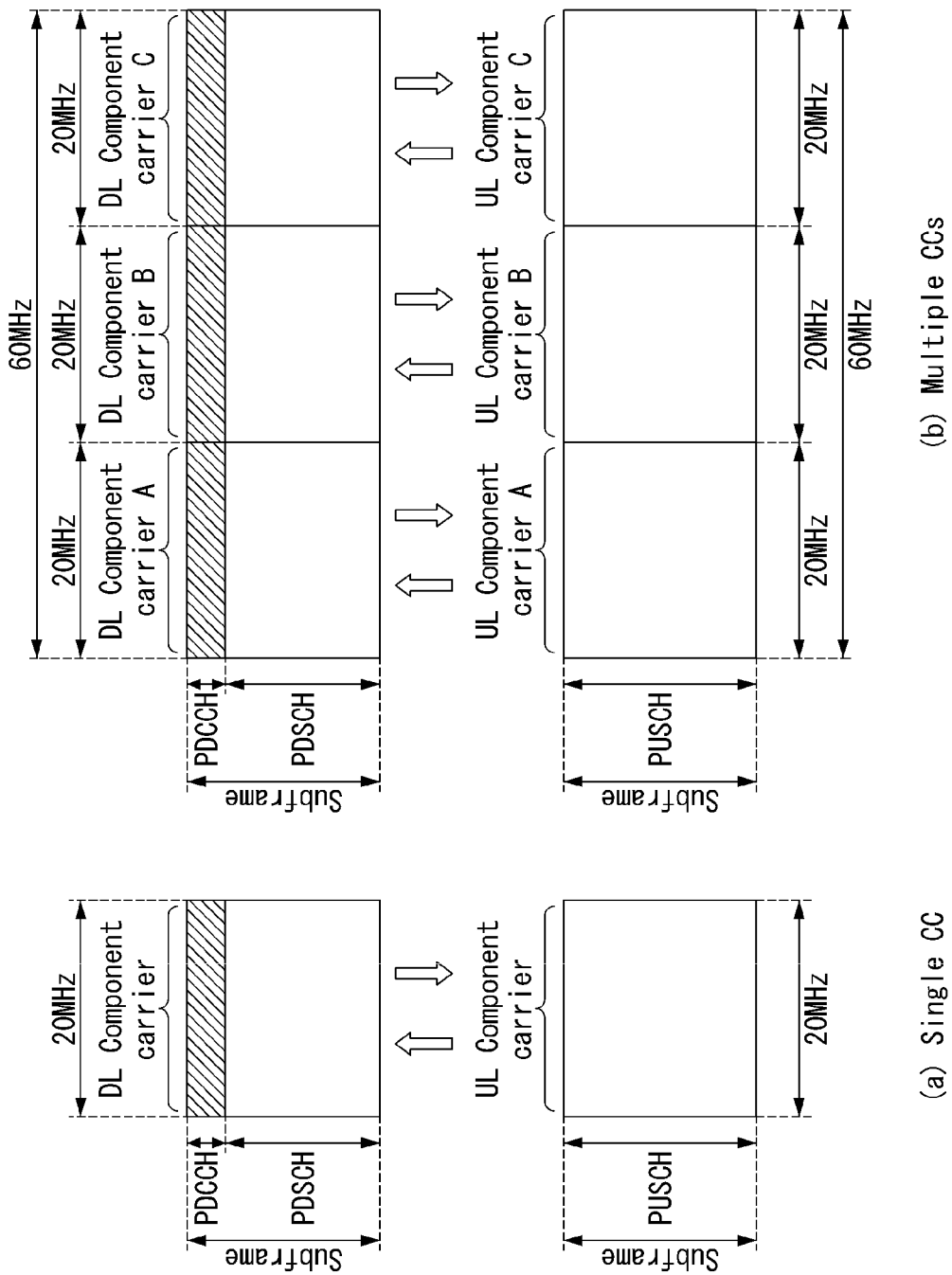
[Figure 7]

[Figure 8]
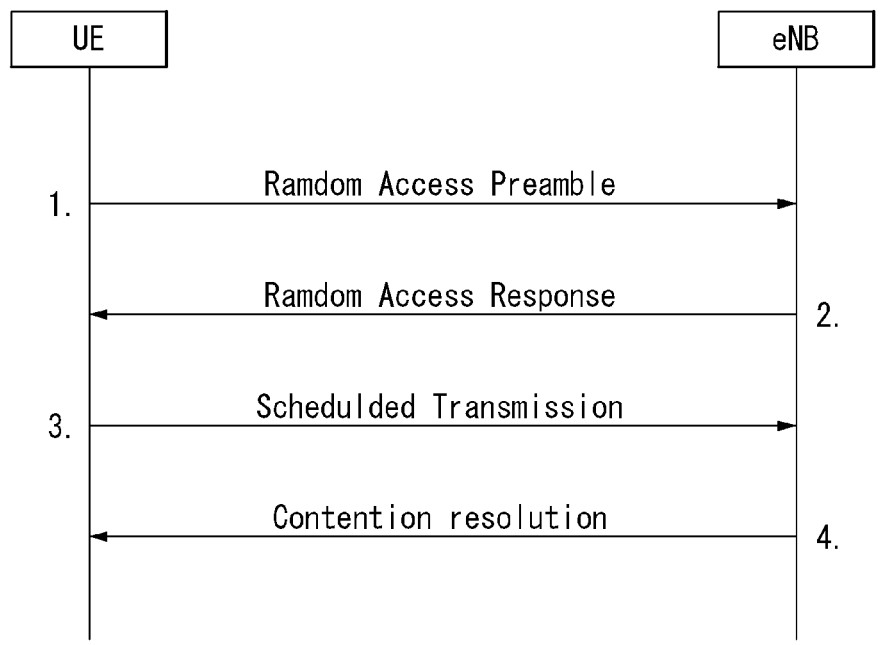

[Figure 9]
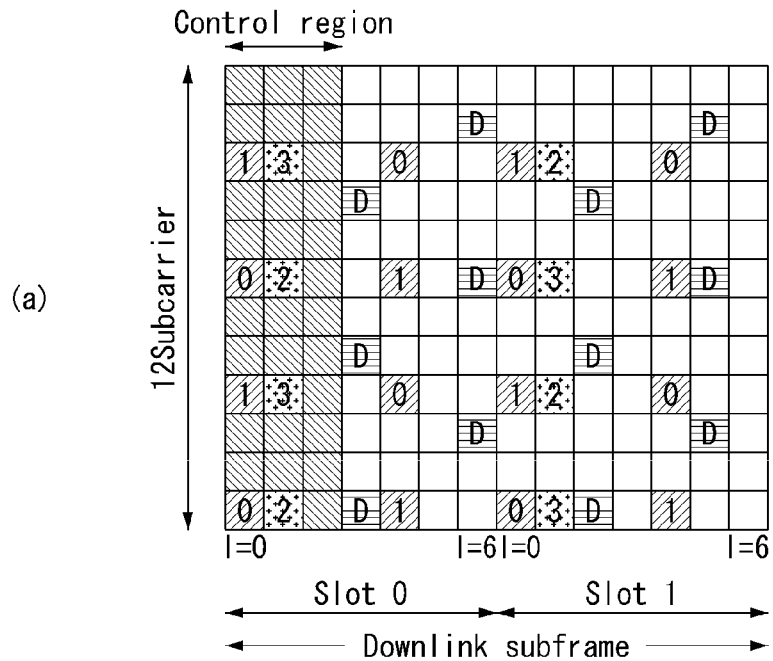
(a)
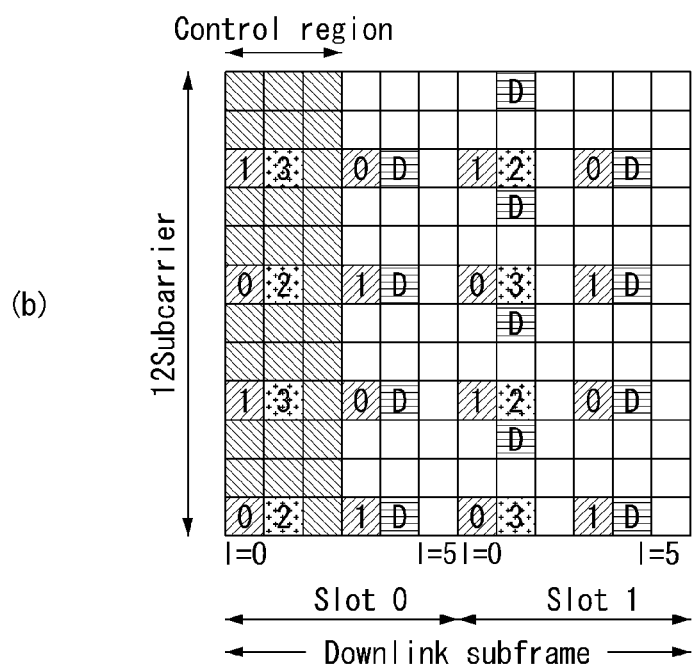
(b)

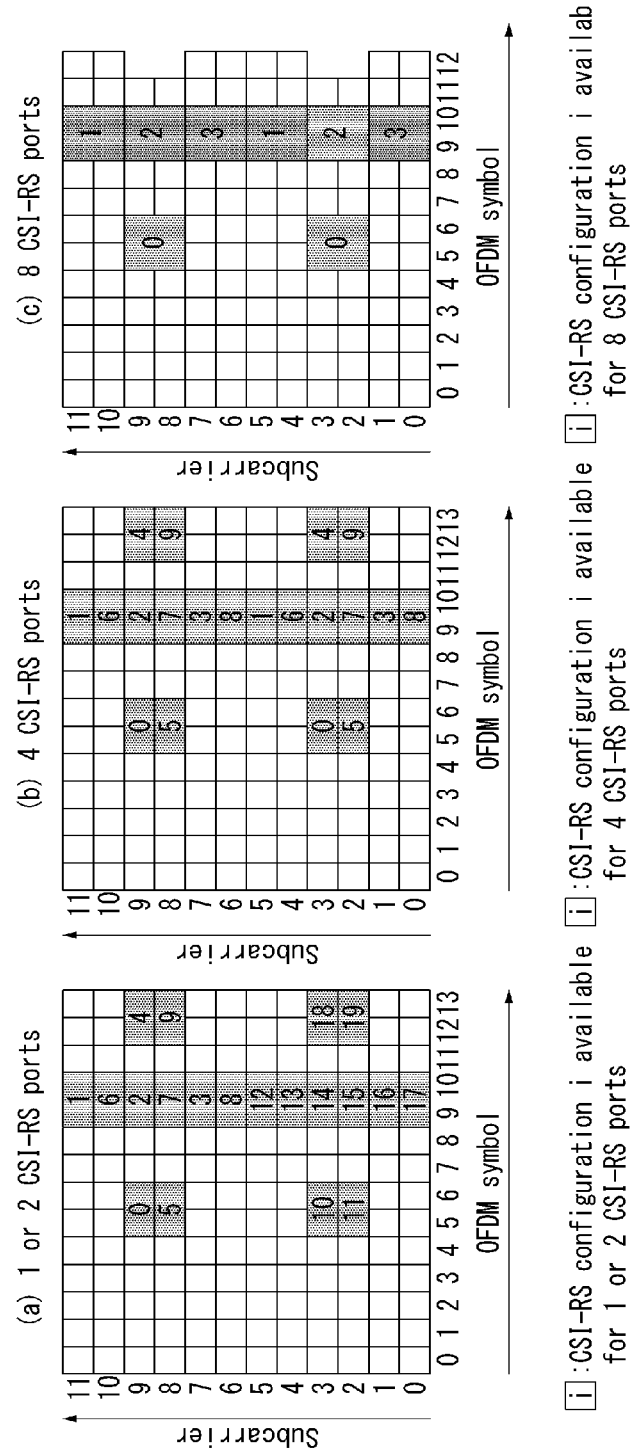
[Figure 10]

【Figure 11】
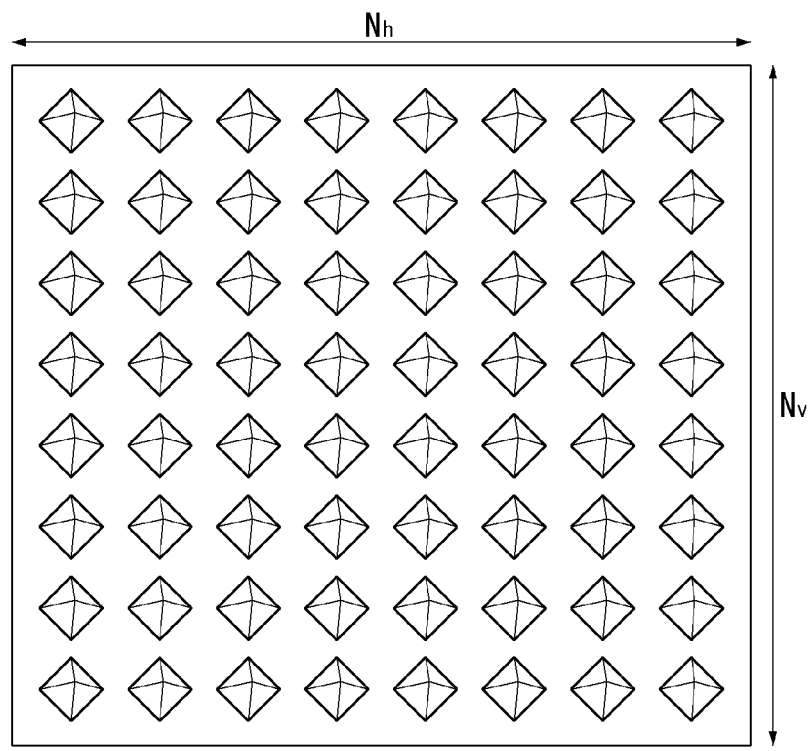
【Figure 12】
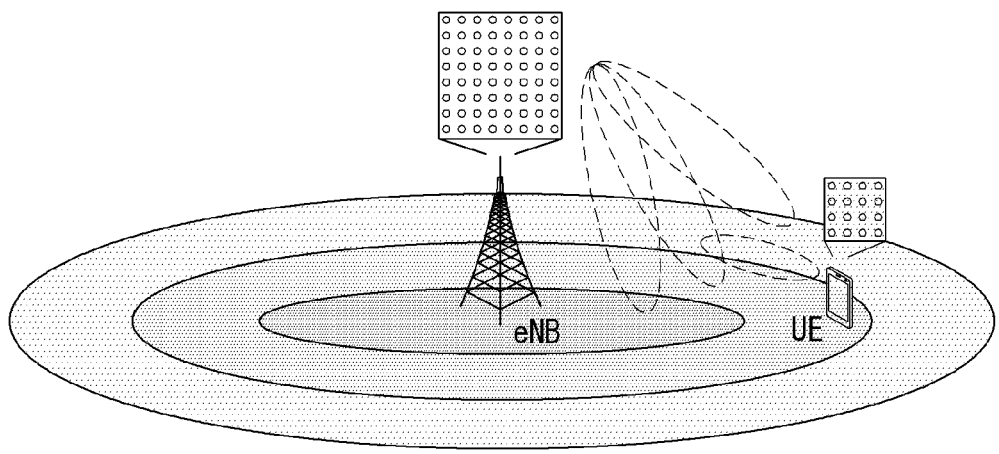

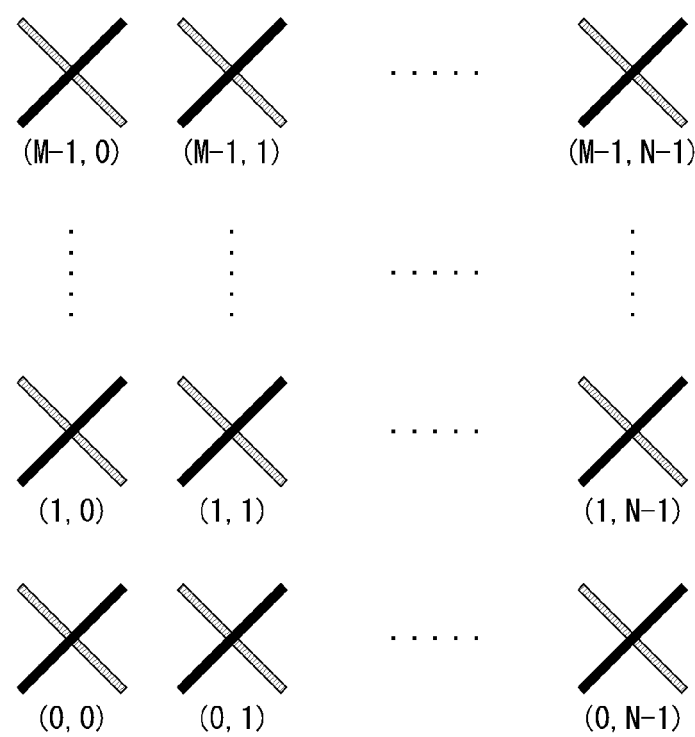
[Figure 13]

[Figure 14]
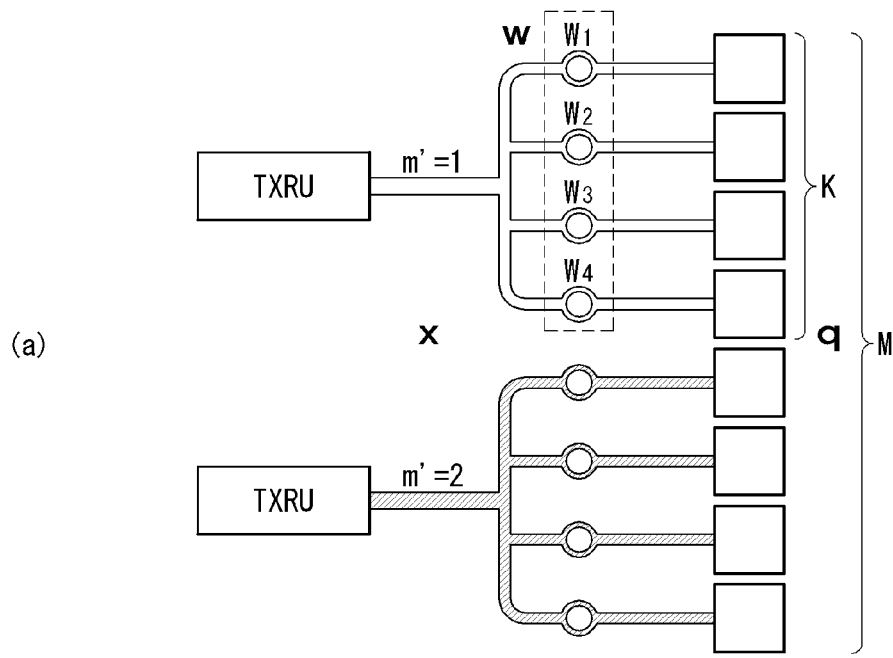
(a)
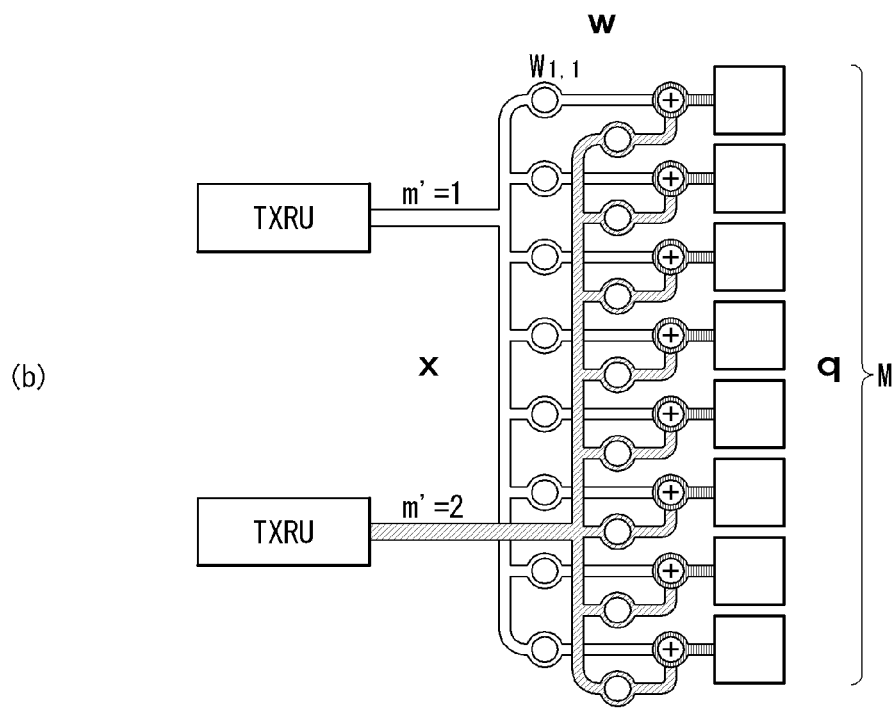
(b)

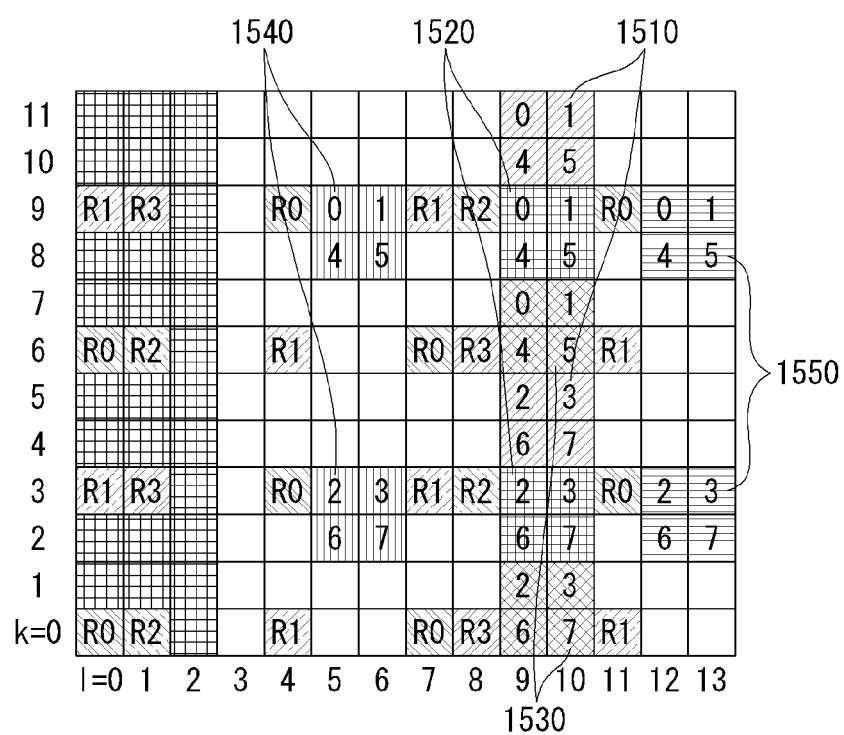
[Figure 15]

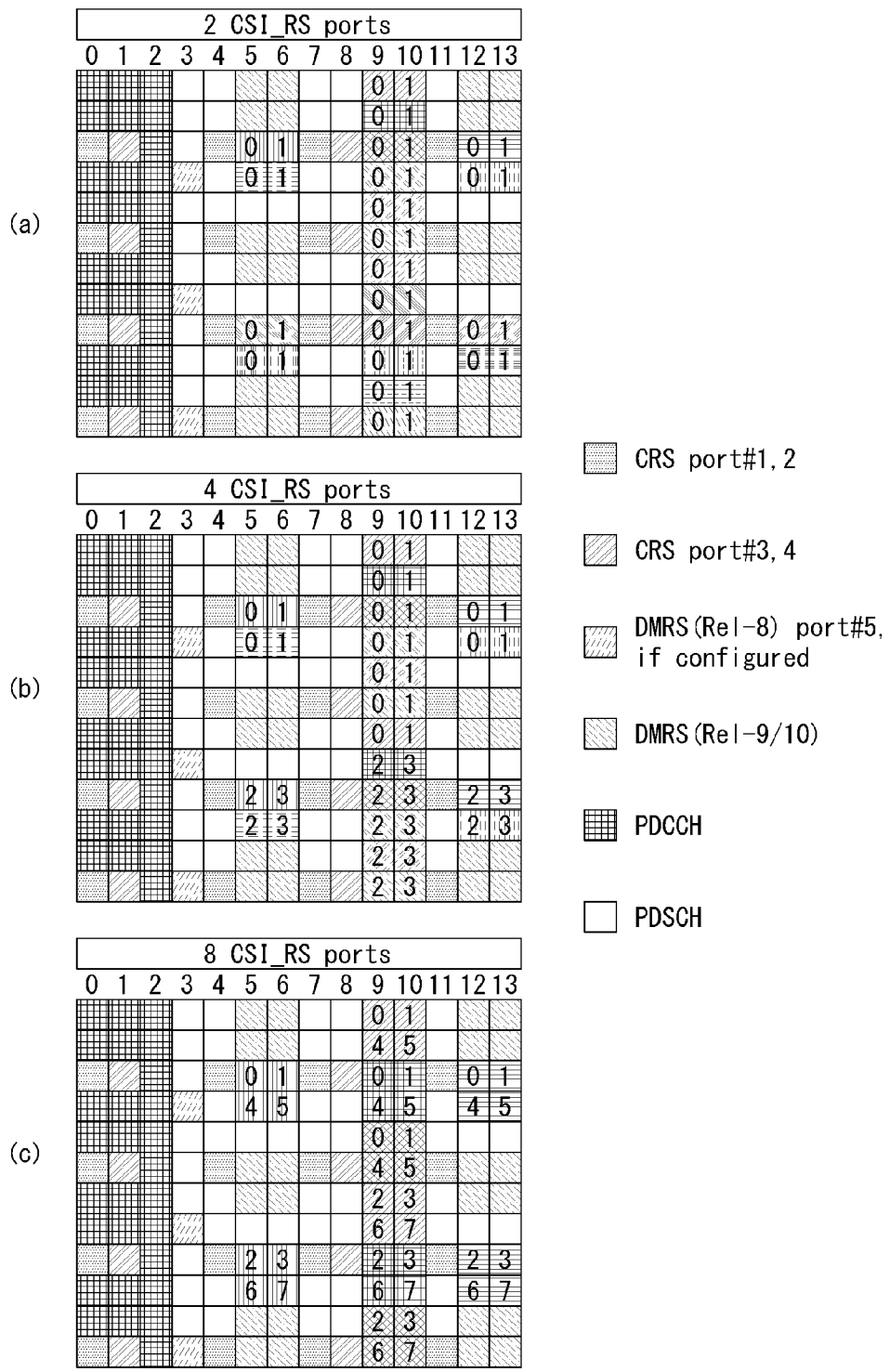
【Figure 16】

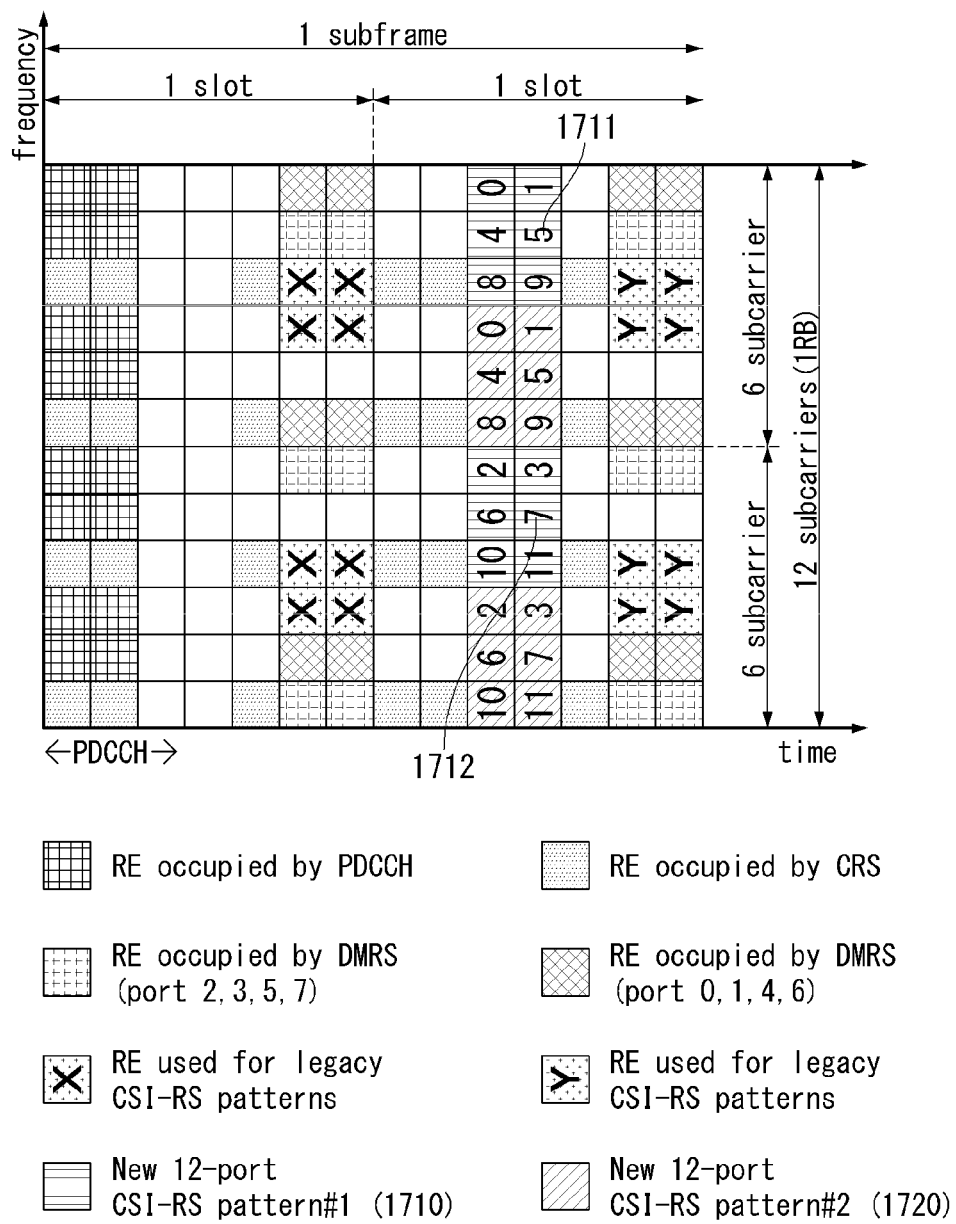
[Figure 17]

【Figure 18】
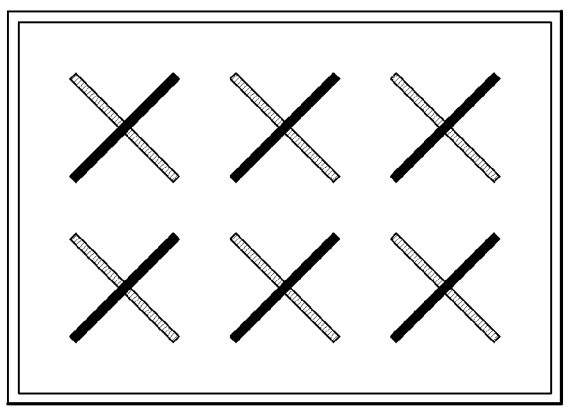
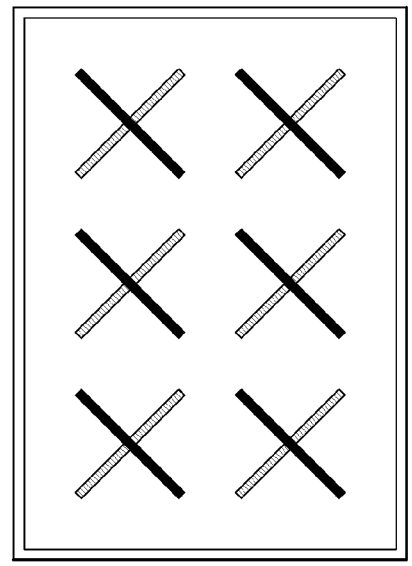
(a)  (b)

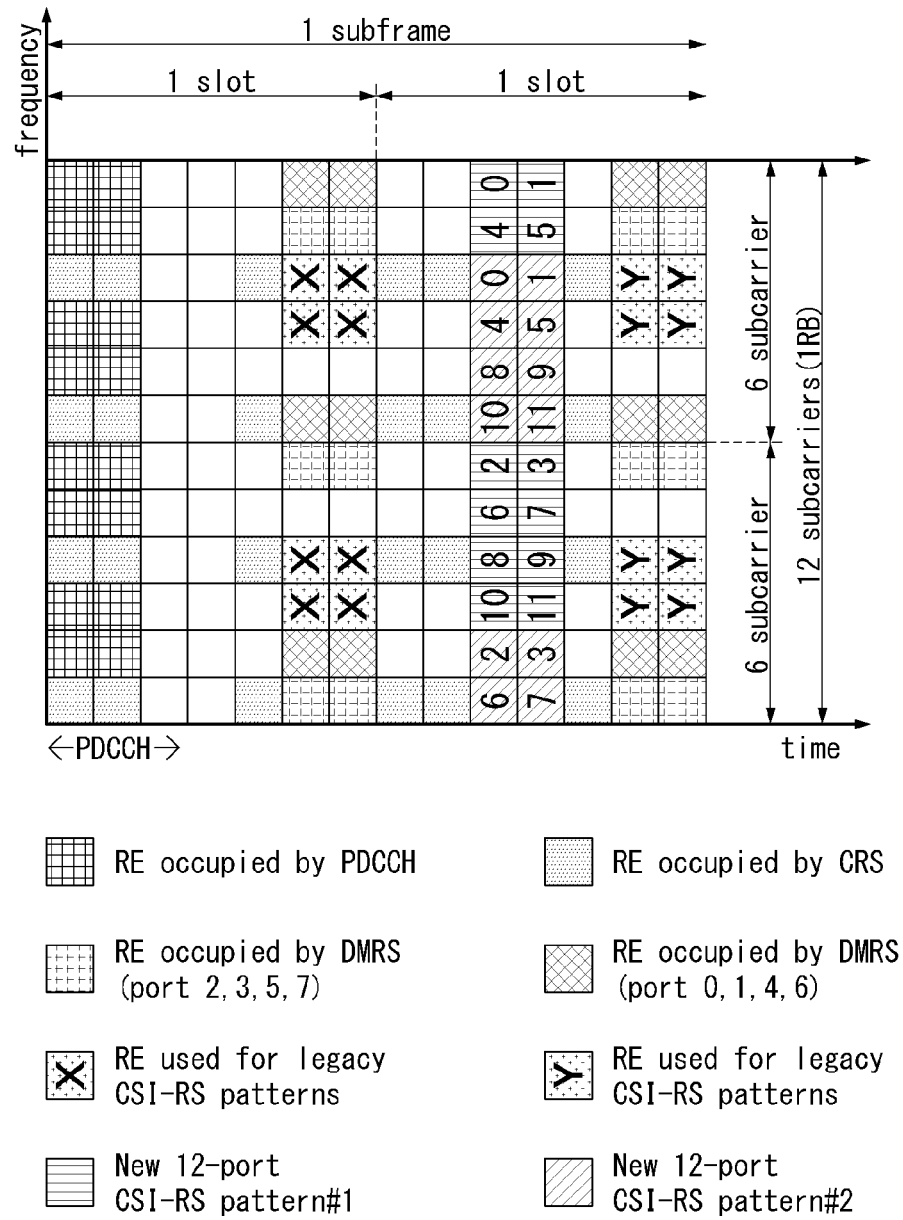
[Figure 19]

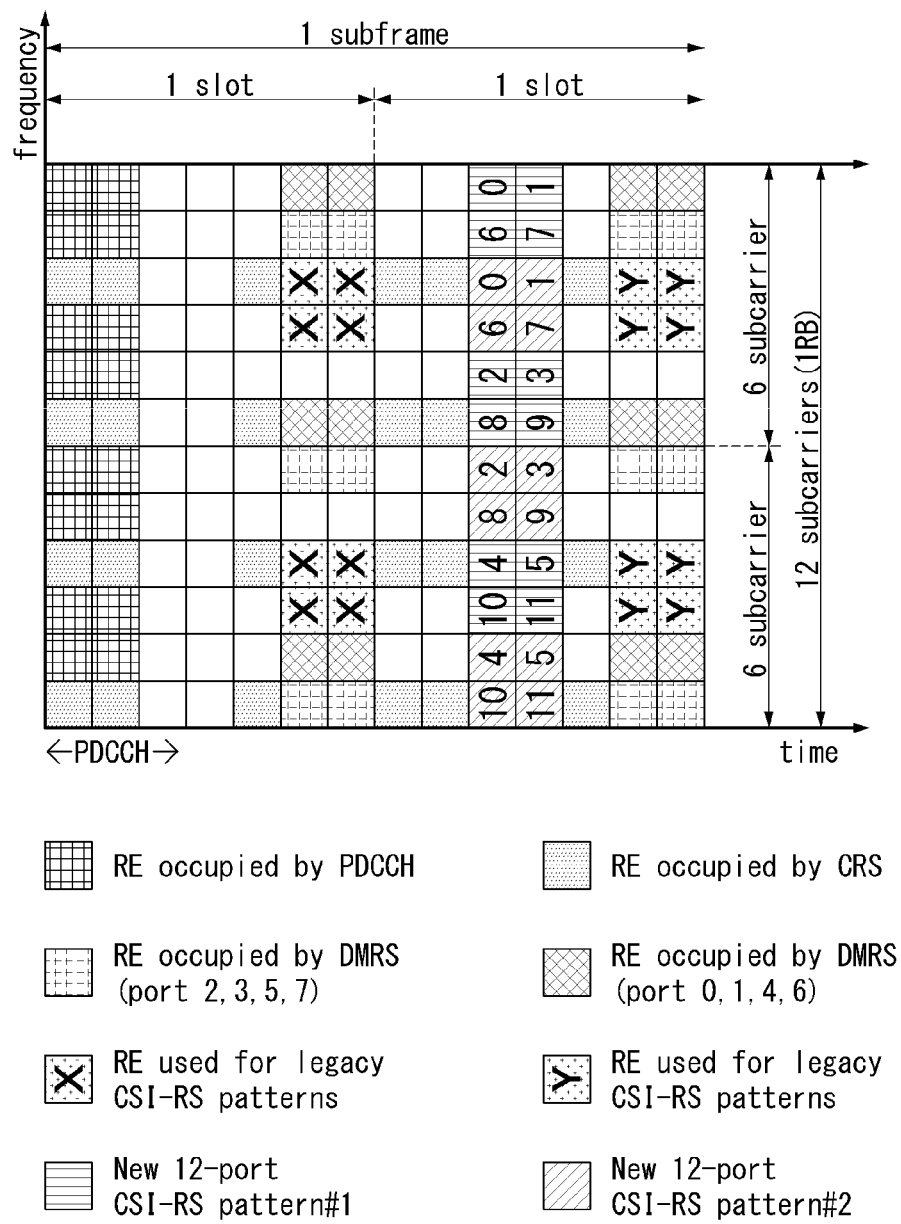
[Figure 20]

【Figure 21】
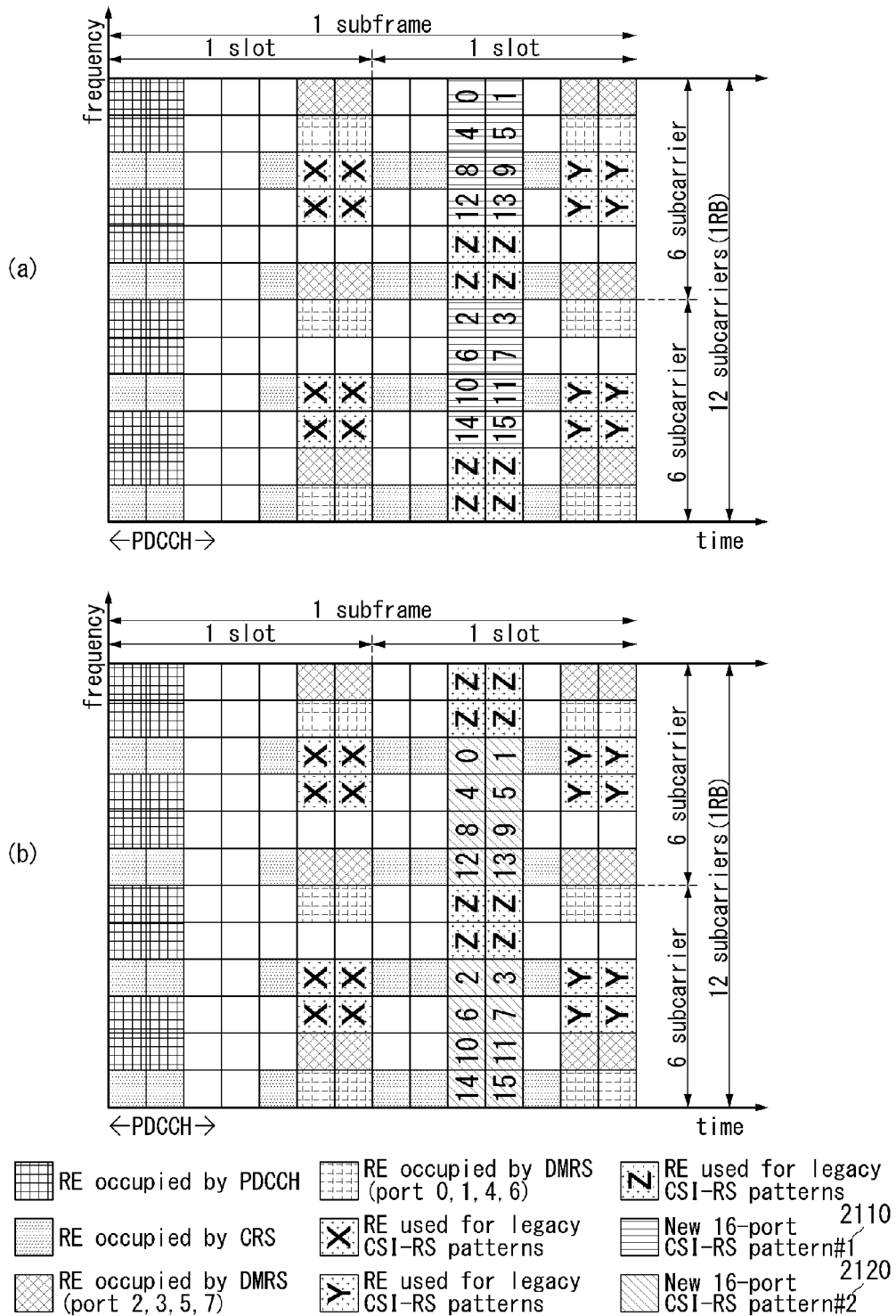

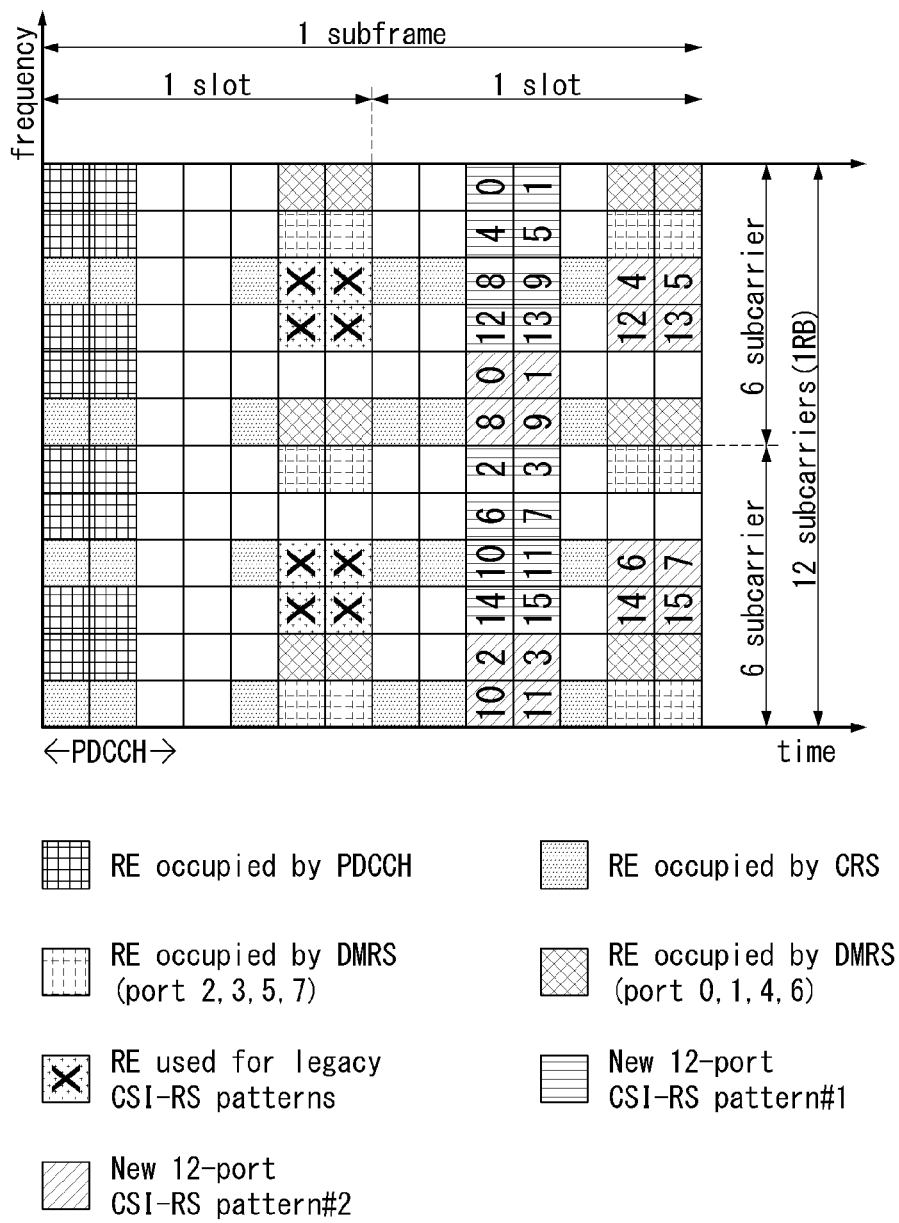
[Figure 22]

[Figure 23]
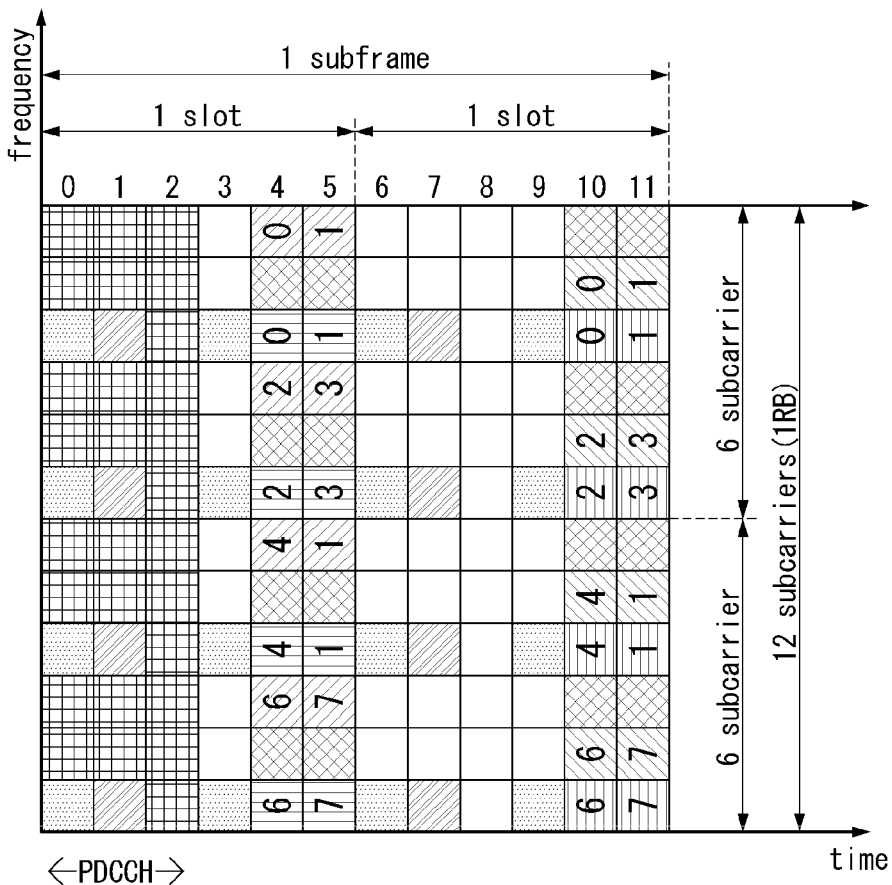

[Figure 24]

[Figure 25]
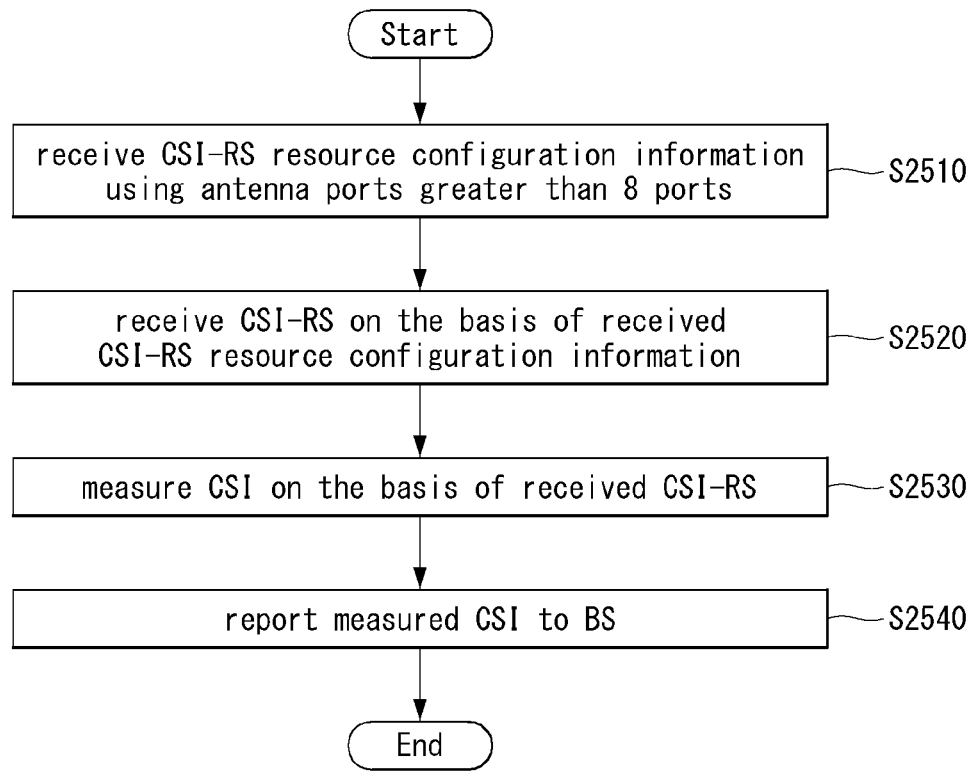
[Figure 26]
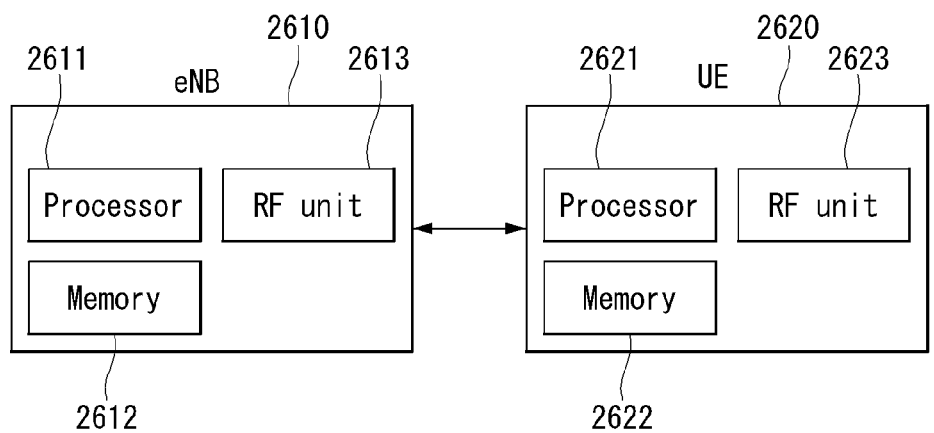

US 10,700,751 B2

METHOD FOR REPORTING CHANNEL STATE INFORMATION IN WIRELESS COMMUNICATION SYSTEM AND DEVICE THEREFOR

CROSS-REFERENCE TO RELATED APPLICATIONS

This Application is a Continuation of U.S. patent application Ser. No. 16/418,543 filed on May 21, 2019, which is a Continuation of U.S. patent application Ser. No. 15/739,929 filed on Dec. 26, 2017 (now U.S. Pat. No. 10,320,465 issued on Jun. 11, 2019), which is the National Phase of PCT International Application No. PCT/KR2016/007448 filed on Jul. 8, 2016, which claims the priority benefit under 35 U.S.C. § 119(e) to U.S. Provisional Application No. 62/190,751 filed on Jul. 10, 2015, and U.S. Provisional Application No. 62/343,017 filed on May 30, 2016, all of these applications are hereby expressly incorporated by reference into the present application.

BACKGROUND OF THE INVENTION

Field of the Invention

The present invention relates to a wireless communication system and, more particularly, to a method for reporting channel state information (CSI) on the basis of a reference signal in a user equipment (UE) and a device therefor.

Discussion of the Related Art

A mobile communication system has been developed to provide a voice service, while ensuring the user's activity. However, the mobile communication system has expanded a scope to a data service, as well as the voice service, and currently, explosive increase in traffic has caused shortage of resource and, as users request higher speed services, a more advanced mobile communication system is required.

The requirements of a next generation mobile communication system are required to support acceptance of explosive data traffic, a significant increase in a data rate per user, acceptance of a significantly increased number of connected devices, very low end-to-end latency, and high energy efficiency. To this end, various technologies such as dual-connectivity, massive multiple input multiple output (MIMO), in-band full duplex, non-orthogonal multiple access (NOMA), support of super-wideband, device networking, and the like, have been researched.

In the current LTE(-A) system, only CSI-RS patterns (or CSI-RS resources) for 1, 2, 4, or 8 ports exist and all have a form of power of 2.

However, in case where the number of antennas is large in a transmitter (or a transmitting device) like a massive MIMO system, the CSI-RS pattern may have various forms, and an antennas configuration may be different even for the same number of antennas.

Considering the structure of the transmitting antenna having various sizes and various patterns, it may be inefficient to limit the number of CSI-RS ports to only the power of 2.

SUMMARY OF THE INVENTION

An aspect of the present invention provides a method for designing a new CSI-RS pattern or a new CSI-RS resource using antenna ports greater than 8 ports in a massive MIMO system.

Another aspect of the present invention provides a rule for antenna port numbering in each CSI-RS resource in a plurality of CSI-RS resources.

Another aspect of the present invention provides a method for mapping CSI-RS configuration information transmitted through higher layer signaling and CSI-RS resources.

Technical subjects obtainable from the present invention are non-limited by the above-mentioned technical task. And, other unmentioned technical tasks may be clearly understood from the following description by those having ordinary skill in the technical field to which the present invention pertains.

According to an aspect of the present invention, there is provided a method for reporting channel state information (CSI), by a user equipment (UE), in a wireless communication system, including: receiving, from a base station (BS), CSI reference signal (RS) resource configuration information indicating resource configuration of a CSI-RS using antenna ports greater than 8 ports, resources of the CSI-RS using the antenna ports greater than 8 ports being configured through aggregation of two or more legacy CSI-RS resources and the two or more legacy CSI-RS resources indicating resources of CSI-RS using antenna ports less than 8 ports; receiving, from the BS, the CSI-RS using antenna ports greater than 8 ports on the basis of the received CSI-RS resource configuration information; and reporting, to the BS, the CSI on the basis of the received CSI-RS.

Also, in this disclosure, the CSI-RS resource configuration information may include a plurality of legacy CSI-RS configuration values, and the plurality of legacy CSI-RS configuration values may correspond to the two or more aggregated legacy CSI-RS resources, respectively.

Also, in this disclosure, the legacy CSI-RS configuration value may be a value indicating a positions of a resource element in which the legacy CSI-RS resource starts.

Also, in this disclosure, a specific legacy CSI-RS configuration value included in the CSI-RS resource configuration information may correspond to a legacy CSI-RS resource having a lowest index or correspond to a legacy CSI-RS resource having a highest index, among the aggregated legacy CSI-RS resources.

Also, in this disclosure, a first legacy CSI-RS configuration value included in the CSI-RS resource configuration information may correspond to a legacy CSI-RS resource having a lowest index among the aggregated legacy CSI-RS resources, and a second legacy CSI-RS configuration value included in the CSI-RS resource configuration information may correspond to a legacy CSI-RS resource having a second lowest index among the aggregated legacy CSI-RS resources.

Also, in this disclosure, the resources of the CSI-RS using antenna ports greater than 8 ports may be included in a predetermined number of contiguous symbols.

Also, in this disclosure, mapping of antenna port numbers by resource elements in the legacy CSI-RS resources may be performed according to a predetermined rule.

Also, in this disclosure, the predetermined rule may be sequentially mapping by legacy CSI-RS resources or sequentially mapping by specific resource elements within each legacy CSI-RS resource.

Also, in this disclosure, the two or more aggregated legacy CSI-RS resources may sequentially correspond to the plurality of legacy configuration values, starting from a lowest value or starting from a highest value.

Also, in this disclosure, the two or more aggregated legacy CSI-RS resources may be 3 or 2 resources.

Also, in this disclosure, the antenna ports greater than the 8 ports may be 12 ports or 16 ports.

Also, in this disclosure, the antenna ports less than 8 ports may be 1 port, 2 ports, 4 ports, or 8 ports.

Also, in this disclosure, the two or more legacy CSI-RS resources may be CSI-RS resource #1, CSI-RS resource #2, and CSI-RS resource #3, and resource elements of the CSI-RS resource #1 may be mapped to antenna ports 15, 16, 17, and 18, resource elements of the CSI-RS resource #2 may be mapped to antenna ports 19, 20, 21, and 22, and resource elements of the CSI-RS resource #3 may be mapped to antenna ports 23, 24, 25, and 26.

Also, in this disclosure, the two or more legacy CSI-RS resources may be CSI-RS resource #1 and CSI-RS resource #2, and resource elements of the CSI-RS resource #1 may be mapped to antenna ports 15, 16, 17, 18, 19, 20, 21, and 22 and resource elements of the CSI-RS resource #2 may be mapped to antenna ports 23, 24, 25, 26, 27, 28, 29, and 30.

Also, in this disclosure, the CSI-RS resource configuration information may be received from the BS through higher layer signaling.

Also, in this disclosure, the resources of the CSI-RS using antenna ports greater than 8 ports may be included in the same subframe.

According to another aspect of the present invention, there is provided a user equipment (UE) for reporting channel state information (CSI) in a wireless communication system, including: a radio frequency (RF) unit transmitting and receiving a radio signal; and a processor controlling the RF unit, wherein the processor performs control to receive, from a base station (BS), CSI reference signal (RS) resource configuration information indicating resource configuration of a CSI-RS using antenna ports greater than 8 ports, wherein resources of the CSI-RS using the antenna ports greater than 8 ports are configured through aggregation of two or more legacy CSI-RS resources and the two or more legacy CSI-RS resources indicate resources of CSI-RS using antenna ports less than 8 ports; receive, from the BS, the CSI-RS using antenna ports greater than 8 ports on the basis of the received CSI-RS resource configuration information; and report, to the BS, the CSI on the basis of the received CSI-RS.

The present disclosure has an effect of maintaining compatibility with a legacy system, as well as efficiently supporting a system having a large number of antennas in a transmitter, such as a massive MIMO system, by setting a new CSI-RS resource by aggregating legacy CSI-RS resources.

Also, the present disclosure has an effect of solving ambiguity between a UE and a BS by defining an accurate mapping relation with the CSI-RS resource for a CSI-RS configuration transmitted and received through the RRC signaling.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows a configuration of a general multi-input multi-output (MIMO) communication system.

FIG. 6 shows channels from multiple transmission antennas to one reception antenna.

FIG. 7 shows an example of component carriers and carrier aggregation in a wireless communication system to which an embodiment of the present invention may be applied.

FIG. 8 shows a contention-based random access procedure in a wireless communication system to which an embodiment of the present invention may be applied.

FIG. 9 shows patterns of reference signals mapped to down link resource block pairs in a wireless communication system to which an embodiment of the present invention may be applied.

FIG. 10 shows a configuration of a CSI-RS in a wireless communication system to which an embodiment of the present invention may be applied.

FIG. 11 shows an example of a 2D active antenna system having 64 antenna elements to which an embodiment of the present invention may be applied.

FIG. 12 shows a system in which a base station (BS) (or eNB) or a terminal (or UE) has multiple transmission/reception antennas capable of forming an AAS-based 3 dimensional (3D) beam in a wireless communication system to which an embodiment of the present invention may be applied.

FIG. 13 shows an example of a polarization-based 2D planar antenna array model.

FIG. 14 shows an example of a model of transceiver units (TXRUs).

FIG. 15 shows an example of 8 port-CSI-RS resource mapping pattern to which a method proposed in this disclosure may be applied.

FIG. 16 shows another example of CSI-RS resources to which a method proposed in this disclosure may be applied.

FIG. 17 shows an example of a 12-port CSI-RS resource structure proposed in this disclosure.

FIG. 18 shows examples of a 2D antenna array model to which a method proposed in this disclosure may be applied.

FIG. 19 shows another example of a 12-port CSI-RS resource mapping pattern proposed in this disclosure.

FIG. 20 shows another example of a 12-port CSI-RS resource mapping pattern proposed in this disclosure.

FIGS. 21 and 22 show examples of a 16-port CSI-RS pattern proposed in this disclosure.

FIG. 23 is a view illustrating another example of a 8-port CSI-RS pattern proposed in this disclosure.

FIG. 24 shows an example of various CSI-RS patterns proposed in this disclosure.

FIG. 25 is a flow chart illustrating an example of a method for reporting channel state information using aggregated CSI-RS resources proposed in this disclosure.

FIG. 26 is a block diagram of a wireless communication device according to an embodiment of the present invention.

DETAILED DESCRIPTION OF THE EMBODIMENTS

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention may be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General wireless communication system to which an embodiment of the present invention may be applied FIG. 1 shows the structure of a radio frame in a wireless communication system to which an embodiment of the present invention may be applied.

3GPP LTE/LTE-A support a type 1 radio frame structure capable of being applied to frequency division duplex (FDD) and a type 2 radio frame structure capable of being applied to time division duplex (TDD).

In FIG. 1, the size of the radio frame in a time domain is expressed in a multiple of a time unit "$T\_s=1/(15000*2048)$." Downlink and uplink transmission includes a radio frame having an interval of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) shows the type 2 radio frame structure.

The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 shows a configuration (i.e., the length of a DwPTS/GP/UpPTS) of the special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention may be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention may be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

AN enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in the resource region other than the PDCCH. The time (i.e., symbol) at which the EPDCCH in the subframe starts can be set in the UE through higher layer signaling (e.g., RRC signaling, etc.).

The EPDCCH is a resource allocation (DL) associated with the DL-SCH related to the transport format, resource allocation and HARQ information, transmission format associated with the UL-SCH, resource allocation and HARQ information, SL-SCH (Sidelink Shared Channel), and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE can be composed of a plurality of enhanced resource element groups (EREGs). EREG is used to define the mapping of ECCEs to REs. There are 16 EREGs per PRB pair. All REs are numbered from 0 to 15 in the order in which the frequency increases, except for the RE carrying the DMRS in each PRB pair.

The UE can monitor a plurality of EPDCCHs. For example, one or two EPDCCH sets may be set in one PRB pair in which the terminal monitors the EPDCCH transmission.

A different coding rate for the EPCCH can be realized by merging different numbers of ECCEs. The EPCCH may use localized transmission or distributed transmission so that the mapping of the ECCE to the RE in the PRB may vary.

FIG. 4 illustrates a structure of an uplink subframe in the wireless communication system to which the present invention may be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

More specifically, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, NT may be expressed as a vector given below because the maximum number of transmittable information is NT.

$$s = [s_1, s_2, \Lambda, s_{N_T}]^T \qquad \text{[Equation 2]}$$

Transmission power may be different in the respective transmission information s1, s2, ..., sNT and in this case, when the respective transmission power is P1, P2, ..., PNT, the transmission information of which the transmission power is adjusted may be expressed as a vector given below.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \qquad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \qquad \text{[Equation 4]}$$

The information vector ŝ of which the transmission power is adjusted is multiplied by a weight matrix W to constitute NT transmission signals x1, x2, ..., xNT which are actually transmitted. Herein, the weight matrix serves to appropriately distribute the transmission information to the respective antennas according to a transmission channel situation, and the like. The transmission signals x1, x2, ..., xNT may be expressed as below by using a vector x.

$$x = \begin{bmatrix} x_1 \\ x_2 \\ M \\ x_i \\ M \\ x_{N_T} \end{bmatrix} = \qquad \text{[Equation 5]}$$

$$\begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs$$

In Equation 5, wij represents a weight between the i-th transmitting antenna and j-th transmission information and W represents the weight as the matrix. The matrix W is called a weight matrix or a precoding matrix.

The transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

A method mixing the spatial multiplexing and the spatial diversity may also be considered. That is, for example, a case may also be considered in which the same signal is transmitted using the spatial diversity through three transmitting antennas and different signals are sent by spatial multiplexing through residual transmitting antennas.

Next, when NR receiving antennas are provided, received signals y1, y2, . . . , yNR of the respective antennas are expressed as a vector y as described below.

$$y = [y_1, y_2, \Lambda, y_{N_R}]^T \quad \text{[Equation 6]}$$

If channels are modeled in the MIMO antenna communication system, the channels may be distinguished based on transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \Lambda, h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \quad \text{[Equation 8]}$$

Since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \Lambda, n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = \quad \text{[Equation 10]}$$

$$Hx + n$$

The number of rows and columns of the channel matrix H representing the state of the channel is determined by the number of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In this specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, a multi-carrier means an aggregation of carriers (alternatively carrier aggregation). In this case, the aggregation of carriers means both an aggregation between continuous carriers and an aggregation between non-contiguous carriers. Further, the number of component carriers aggregated between downlink and uplink may be differently set. A case where the number of downlink component carriers (hereinafter referred to as a "DL CC") and the number of uplink component carriers (hereinafter, referred to as an "UL CC") are the same is referred to as a "symmetric aggregation", and a case where the number of downlink component carriers and the number of uplink component carriers are different is referred to as an "asymmetric aggregation." The carrier aggregation may be used interchangeably with a term, such as a bandwidth aggregation or a spectrum aggregation.

A carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell or S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively a primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRCConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 7 illustrates examples of a component carrier and carrier aggregation in the wireless communication system to which the present invention may be applied.

FIG. 7a illustrates a single carrier structure used in an LTE system. The component carrier includes the DL CC and the UL CC. One component carrier may have a frequency range of 20 MHz.

FIG. 7b illustrates a carrier aggregation structure used in the LTE system. In the case of FIG. 7b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

If one or more S cells are configured in a UE, a network may activate or deactivate the configured S cell(s). A P cell is always activated. The network activates or deactivates the S cell(s) by sending an activation/deactivation MAC control element.

The activation/deactivation MAC control element has a fixed size and includes a single octet including seven C fields and one R field. The C field is configured for each S cell index "SCellIndex", and indicates the activation/deactivation state of the S cell. When the value of the C field is set to "1", it indicates that an S cell having a corresponding S cell index is activated. When the value of the C field is set to "0", it indicates that an S cell having a corresponding S cell index is deactivated.

Furthermore, the UE maintains a timer "sCellDeactivationTimer" for each configured S cell and deactivates a related S cell when the timer expires. The same initial value of the timer is applied to each instance of the timer "sCellDeactivationTimer" and set by RRC signaling. When the S cell(s) are added or after handover, initial S cell(s) are a deactivation state.

The UE performs the following operation on each of the configured S cell(s) in each TTI.

When the UE receives an activation/deactivation MAC control element that activates an S cell in a specific TTI (subframe n), the UE activates the S cell in a corresponding TTI (a subframe n+8 or thereafter) on predetermined timing and (re)starts a timer related to the corresponding S cell. What the UE activates the S cell means that the UE applies a common S cell operation, such as the transmission of a sounding reference signal (SRS), the reporting of a channel quality indicator (CQI)/precoding matrix indicator (PMI)/rank indication (RI)/precoding type indicator (PTI), the monitoring of a PDCCH and the monitoring of a PDCCH for an S cell on the S cell.

When the UE receives an activation/deactivation MAC control element that deactivates an S cell in a specific TTI (subframe n) or a timer related to a specific TTI (subframe n)-activated S cell expires, the UE deactivates the S cell in a corresponding TTI (subframe n+8 or thereafter) on predetermined timing, stops the timer of the corresponding S cell, and flushes all of HARQ buffers related to the corresponding S cell.

If a PDCCH on an activated S cell indicates an uplink grant or downlink assignment or a PDCCH on a serving cell that schedules the activated S cell indicates an uplink grant or downlink assignment for the activated S cell, the UE restarts a timer related to the corresponding S cell.

When the S cell is deactivated, the UE does not send an SRS on the S cell, does not report a CQI/PMI/RI/PTI for the S cell, does not send an UL-SCH on the S cell, and does not monitor a PDCCH on the S cell.

Random Access Procedure

A random access procedure provided by LTE/LTE-A systems is described below.

The random access procedure is used for a UE to obtain uplink synchronization with an eNB or to have uplink radio resources allocated thereto. When the UE is powered on, the UE obtains downlink synchronization with an initial cell and receives system information. The UE obtains information about a set of available random access preambles and radio resources used to send a random access preamble from the system information. The radio resources used to send the random access preamble may be specified as a combination of at least one subframe index and an index in a frequency domain. The UE sends a random access preamble randomly selected from the set of random access preambles. An eNB that has received the random access preamble sends a timing alignment (TA) value for uplink synchronization to the UE through a random access response. Accordingly, the UE obtains uplink synchronization.

The random access procedure is common to frequency division duplex (FDD) and time division duplex (TDD). The random access procedure is not related to a cell size and is also not related to the number of serving cells if a component aggregation (CA) has been configured.

First, the UE may perform the random access procedure as in the following cases.

If the UE performs initial access in the RRC idle state because it does not have RRC connection with the Enb If the UE performs an RRC connection re-establishment procedure If the UE first accesses a target cell in a handover process If the random access procedure is requested by a command from the eNB If there is data to be transmitted in downlink in an uplink non-synchronized situation during the RRC connection state If there is a data to be transmitted in uplink in an uplink non-synchronized situation or in a situation in which designated radio resources used to request radio resources have not been allocated during the RRC connection state If the positioning of the UE is performed in a situation in which timing advance is necessary during the RRC connection state If a recovery process is performed when a radio link failure or handover failure occurs In 3GPP Rel-10, a method for applying a timing advance (TA) value applicable to one specific cell (e.g., a P cell) to a plurality of cells in common in a radio access system supporting a component aggregation has been taken into consideration. A UE may aggregate a plurality of cells belonging to different frequency bands (i.e., greatly spaced apart on the frequency) or a plurality of cells having different propagation properties. Furthermore, in the case of a specific cell, in order to expand coverage or remove a coverage hole, if the UE performs communication with an eNB (i.e., a macro eNB) through one cell and performs communication with a secondary eNB (SeNB) through the other cell in a situation in which a remote radio header (RRH) (i.e., repeater), a small cell such as a femto cell or a pico cell, or the SeNB has been disposed within the cell, a plurality of cells may have different delay properties. In this case, if the UE performs uplink transmission using a method for applying one TA value to a plurality of cells in common, the synchronization of an uplink signal transmitted on the plurality of cells may be severely influenced. Accordingly, a plurality of TAs may be used in a CA situation in which a plurality of cells has been aggregated. In 3GPP Rel-11, in order to support multiple TAs, the independent allocation of the TAs may be taken into consideration for each specific cell group. This is called a TA group (TAG). The TAG may include one or more cells. The same TA may be applied to one or more cells included in a TAG in common. In order to support such multiple TAs, an MAC TA command control element includes a TAG identity (ID) of 2 bits and a TA command field of 6 bits.

A UE in which a CA has been configured performs a random access procedure if it performs the random access procedure in relation to a P cell. In the case of a TAG to which the P cell belongs (i.e., a primary TAG (pTAG)), as in a conventional technology, TA determined based on the P cell or coordinated through a random access procedure involved in the P cell may be applied to all of cell(s) within the pTAG. In contrast, in the case of a TAG including only an S cell (i.e., a secondary TAG (sTAG)), TA determined based on a specific S cell within the sTAG may be applied to all of cell(s) within the corresponding sTAG. In this case, the TA may be obtained by a random access procedure initiated by an eNB. More specifically, the S cell is configured as a random access channel (RACH) resource within the sTAG. In order to determine the TA, the eNB requests RACH access in the S cell. That is, the eNB initiates RACH transmission on S cells in response to a PDCCH order transmitted in the P cell. A response message for an S cell preamble is transmitted through a P cell using an RA-RNTI. The UE may apply TA, determined based on an S cell to which random access has been successfully completed, to all of cell(s) within a corresponding sTAG. As described above, the random access procedure may be performed even in an S cell in order to obtain the TA of an sTAG to which the S cell belongs even in the corresponding S cell.

An LTE/LTE-A system provides a contention-based random access procedure for randomly selecting, by a UE, one preamble within a specific set and using the selected preamble and a non-contention-based random access procedure for using a random access preamble allocated to only a specific UE by an eNB in a process of selecting a random access preamble (RACH preamble). In this case, the non-contention-based random access procedure may be used for only UE positioning and/or timing advance alignment for an sTAG if it is requested in the handover process or in response to a command from the eNB. After the random access procedure is completed, common uplink/downlink transmission is performed.

A relay node (RN) also supports both the contention-based random access procedure and the non-contention-based random access procedure. When a relay node performs the random access procedure, it suspends an RN subframe configuration at that point of time. That is, this means that it temporarily discards an RN subframe. Thereafter, an RN subframe configuration is restarted at a point of time at which a random access procedure is successfully completed.

FIG. 8 is a diagram for illustrating a contention-based random access procedure in a wireless communication system to which an embodiment of the present invention may be applied.

(1) First Message (Msg 1 or Message 1)

First, UE randomly selects one random access preamble (RACH preamble) from a set of random access preambles indicated by system information or a handover command, selects a physical RACH (PRACH) resource capable of sending the random access preamble, and sends the selected physical RACH (PRACH).

The random access preamble is transmitted through 6 bits in an RACH transport channel. The 6 bits include a random identity of 5 bits for identifying the UE that has performed RACH transmission and 1 bit (e.g., indicate the size of a third message Msg3) for indicating additional information.

An eNB that has received the random access preamble from the UE decodes the random access preamble and obtains an RA-RNTI. The RA-RNTI related to the PRACH in which the random access preamble has been transmitted is determined by the time-frequency resource of the random access preamble transmitted by the corresponding UE.

(2) Second Message (Msg 2 or Message 2)

The eNB sends a random access response, addressed by the RA-RNTI obtained through the preamble on the first message, to the UE. The random access response may include a random access (RA) preamble index/identifier, uplink (UL) assignment providing notification of uplink radio resources, a temporary C-RNTI, and a time alignment command (TAC). The TAC is information indicative of a time alignment command that is transmitted from the eNB to the UE in order to maintain uplink time alignment. The UE updates uplink transmission timing using the TAC. When the UE updates time synchronization, it initiates or restarts a time alignment timer. An UL grant includes uplink resource allocation used for the transmission of a scheduling message (third message) to be described later and a transmit power command (TPC). The TPC is used to determine transmission power for a scheduled PUSCH.

After the UE sends the random access preamble, it attempts to receive its own random access response within a random access response window indicated by the eNB through system information or a handover command, detects a PDCCH masked with an RA-RNTI corresponding to the PRACH, and receives a PDSCH indicated by the detected PDCCH. Information about the random access response may be transmitted in the form of a MAC packet data unit (PDU). The MAC PDU may be transferred through the PDSCH. The PDCCH may include information about the UE that needs to receive the PDSCH, information about the frequency and time of the radio resources of the PDSCH, and the transmission format of the PDSCH. As described above, once the UE successfully detects the PDCCH transmitted thereto, it may properly receive the random access response transmitted through the PDSCH based on the pieces of information of the PDCCH.

The random access response window means a maximum time interval during which the UE that has sent the preamble waits to receive the random access response message. The random access response window has a length of "ra-ResponseWindowSize" that starts from a subframe subsequent to three subframes from the last subframe in which the preamble is transmitted. That is, the UE waits to receive the random access response during a random access window secured after three subframes from a subframe in which the preamble has been transmitted. The UE may obtain the parameter value of a random access window size "ra-ResponseWindowsize" through the system information. The random access window size may be determined to be a value between 2 and 10.

When the UE successfully receives the random access response having the same random access preamble index/identifier as the random access preamble transmitted to the eNB, it suspends the monitoring of the random access response. In contrast, if the UE has not received a random access response message until the random access response window is terminated or the UE does not receive a valid random access response having the same random access preamble index as the random access preamble transmitted to the eNB, the UE considers the reception of a random access response to be a failure and then may perform preamble retransmission.

As described above, the reason why the random access preamble index is necessary for the random access response is to provide notification that an UL grant, a TC-RNTI and a TAC are valid for which UE because random access response information for one or more UEs may be included in one random access response.

(3) Third Message (Msg 3 or Message 3)

When the UE receives a valid random access response, it processes each of pieces of information included in the random access response.

That is, the UE applies a TAC to each of the pieces of information and stores a TC-RNTI. Furthermore, the UE sends data, stored in the buffer of the UE, or newly generated data to the eNB using an UL grant. If the UE performs first connection, an RRC connection request generated in the RRC layer and transferred through a CCCH may be included in the third message and transmitted. In the case of an RRC connection re-establishment procedure, an RRC connection re-establishment request generated in the RRC layer and transferred through a CCCH may be included in the third message and transmitted. Furthermore, the third message may include an NAS access request message.

The third message may include the identity of the UE. In the contention-based random access procedure, the eNB is unable to determine which UE can perform the random access procedure. The reason for this is that the UE has to be identified in order to perform a collision resolution.

A method for including the identity of UE includes two methods. In the first method, if UE has already had a valid cell identity(C-RNTI) allocated in a corresponding cell prior to a random access procedure, the UE sends its own cell identity through an uplink transmission signal corresponding to an UL grant. In contrast, if a valid cell identity has not been allocated to the UE prior to a random access procedure, the UE includes its own unique identity (e.g., an S-TMSI or a random number) in an uplink transmission signal and sends the uplink transmission signal. In general, the unique identity is longer than a C-RNTI. In transmission on an UL-SCH, UE-specific scrambling is used. In this case, if a C-RNTI has not been allocated to the UE, the scrambling may not be based on the C-RNTI, and instead a TC-RNTI received in a random access response is used. If the UE has sent data corresponding to the UL grant, it initiates a timer for a collision resolution (i.e., a contention resolution timer).

(4) Fourth Message (Msg 4 or Message 4)

When the C-RNTI of the UE is received through the third message from the UE, the eNB sends a fourth message to the UE using the received C-RNTI. In contrast, when the eNB receives a unique identity (i.e., an S-TMSI or a random number) through the third message from the UE, it sends the fourth message to the UE using a TC-RNTI allocated to the corresponding UE in a random access response. In this case, the fourth message may correspond to an RRC connection setup message including a C-RNTI.

After the UE sends data including its own identity through the UL grant included in the random access response, it waits for an instruction from the eNB for a collision resolution. That is, the UE attempts to receive a PDCCH in order to receive a specific message. A method for receiving the PDCCH includes two methods. As described above, if the third message transmitted in response to the UL grant includes a C-RNTI as its own identity, the UE attempts the reception of a PDCCH using its own C-RNTI. If the identity is a unique identity (i.e., an S-TMSI or a random number), the UE attempts the reception of a PDCCH using a TC-RNTI included in the random access response. Thereafter, in the former case, if the UE has received a PDCCH through its own C-RNTI before a collision resolution timer expires, the UE determines that the random access procedure has been normally performed and terminates the random access procedure. In the latter case, if the UE has received a PDCCH through a TC-RNTI before a collision resolution timer expires, the UE checks data in which a PDSCH indicated by the PDCCH is transferred. If, as a result of the check, it is found that the unique identity of the UE has been included in the contents of the data, the UE determines that the random access procedure has been normally performed and terminates the random access procedure. The UE obtains the C-RNTI through the fourth message. Thereafter, the UE and a network send or receive a UE-dedicated message using the C-RNTI.

A method for a collision resolution in random access is described below.

The reason why a collision occurs in performing random access is that the number of random access preambles is basically limited. That is, a UE randomly selects one of common random access preambles and sends the selected random access preamble because an eNB cannot assign a random access preamble unique to a UE to all of UEs. Accordingly, two or more UEs may select the same random access preamble and send it through the same radio resources (PRACH resource), but the eNB determines the received random access preambles to be one random access preamble transmitted by one UE. For this reason, the eNB sends a random access response to the UE, and expects that the random access response will be received by one UE. As described above, however, since a collision may occur, two or more UEs receive one random access response and thus the eNB performs an operation according to the reception of each random access response for each UE. That is, there is a problem in that the two or more UEs send different data through the same radio resources using one UL grant included in the random access response. Accordingly, the transmission of the data may all fail, and the eNB may receive only the data of a specific UE depending on the location or transmission power of the UEs. In the latter case, all of the two or more UEs assume that the transmission of their data was successful, and thus the eNB has to notify UEs that have failed in the contention of information about the failure. That is, providing notification of information about the failure or success of the contention is called a collision resolution.

A collision resolution method includes two methods. One method is a method using a collision resolution timer, and the other method is a method of sending the identity of a UE that was successful in a contention to other UEs. The former method is used when a UE already has a unique C-RNTI prior to a random access process. That is, the UE that has already had the C-RNTI sends data, including its own C-RNTI, to an eNB in response to a random access response, and drives a collision resolution timer. Furthermore, when PDCCH information indicated by its own C-RNTI is received before the collision resolution timer expires, the UE determines that it was successful in the contention and normally terminates the random access. In contrast, if the UE does not receive a PDCCH indicated by its own C-RNTI before the collision resolution timer expires, the UE determines that it failed in the contention and may perform a random access process again or may notify a higher layer of the failure of the contention. In the latter method of the two contention resolution methods, that is, the method of sending the identity of a successful UE, is used if a UE does not have a unique cell identity prior to a random access process. That is, if the UE does not have its own cell identity, the UE includes an identity (or an S-TMSI or a random number) higher than the cell identity in data based on UL grant information included in a random access response, sends the data, and drives a collision resolution timer. If data including its own higher identity is transmitted through a DL-SCH before the collision resolution timer expires, the UE determines that the random access process was successful. In contrast, if data including its own higher identity is not received through a DL-SCH before the collision resolution timer expires, the UE determines that the random access process has failed.

Unlike in the contention-based random access procedure shown in FIG. 8, the operation in the non-contention-based random access procedure is terminated by only the transmission of the first message and the second message. In this case, before a UE sends a random access preamble to an eNB as the first message, the eNB allocates the random access preamble to the UE, and the UE sends the allocated random access preamble to the eNB as the first message and receives a random access response from the eNB. Accordingly, the random connection procedure is terminated.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using a distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system may be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal may be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 9 illustrates a reference signal pattern mapped to a downlink resource block pair in the wireless communication system to which the present invention may be applied.

Referring to FIG. 9, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 9*a*) and a length of 12 OFDM symbols in the case of an extended cyclic prefix (CP) (FIG. 9*b*). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

The DRS is described in more detail below. The DRS is used to demodulate data. Precoding weight used for a specific UE in MIMO antenna transmission is used without any change in order for a UE to estimate a corresponding channel in association with a transport channel transmitted in each transmission antenna when the UE receives a reference signal.

The 3GPP LTE system (e.g., Release-8) supports up to a maximum of four transmission antennas, and a DRA for rank 1 beamforming is defined. The DRS for rank 1 beamforming further indicates a reference signal an antenna port index 5.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15, 16, p=15, ..., 18, or p=15, ..., 22. The CSI-RS may be defined only for the subcarrier interval $\Delta f32$ 15 kHz.

(k',l') (herein, k' is a subcarrier index in a resource block, and l' represents an OFDM symbol index in a slot) and the condition of $n_s$ is determined according to the CSI-RS configuration shown in Table 3 or Table 4 below.

Table 3 exemplifies the mapping of (k',l') according to the CSI-RS configuration for the normal CP.

TABLE 3

Table 4 exemplifies the mapping of (k', l') according to the CSI-RS configuration for the extended CP.

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structured type 1 and 2 | 0 | (9, 5) | 0 | (9, 5) | 0 | (9, 5) | 0 |
|  | 1 | (11, 2) | 1 | (11, 2) | 1 | (11, 2) | 1 |
|  | 2 | (9, 2) | 1 | (9, 2) | 1 | (9, 2) | 1 |
|  | 3 | (7, 2) | 1 | (7, 2) | 1 | (7, 2) | 1 |
|  | 4 | (9, 5) | 1 | (9, 5) | 1 | (9, 5) | 1 |
|  | 5 | (8, 5) | 0 | (8, 5) | 0 |  |  |
|  | 6 | (10, 2) | 1 | (10, 2) | 1 |  |  |
|  | 7 | (8, 2) | 1 | (8, 2) | 1 |  |  |
|  | 8 | (6, 2) | 1 | (6, 2) | 1 |  |  |
|  | 9 | (8, 5) | 1 | (8, 5) | 1 |  |  |
|  | 10 | (3, 5) | 0 |  |  |  |  |
|  | 11 | (2, 5) | 0 |  |  |  |  |
|  | 12 | (5, 2) | 1 |  |  |  |  |
|  | 13 | (4, 2) | 1 |  |  |  |  |
|  | 14 | (3, 2) | 1 |  |  |  |  |
|  | 15 | (2, 2) | 1 |  |  |  |  |
|  | 16 | (1, 2) | 1 |  |  |  |  |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

Table 4 illustrates mapping of (k',l') from the CSI-RS configuration in the extended CP.

TABLE 4

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |

TABLE 4-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighbor cells may have different configurations to the maximum. In addition, the CSI-RS configuration may be divided into the case of being applied to both the FDD frame and the TDD frame and the case of being applied to only the TDD frame.

Based on Table 3 and Table 4, (k',l') and $n_s$ are determined according to the CSI-RS configuration. By applying these values to Equation 19, the time-frequency resource that each CSI-RS antenna port uses for transmitting the CSI-RS is determined.

FIG. 10 is a diagram illustrating the CSI-RS configuration in a wireless communication system to which the present invention may be applied.

FIG. 10(a) shows twenty CSI-RS configurations that are usable in the CSI-RS transmission through one or two CSI-RS antenna ports, and FIG. 10(b) shows ten CSI-RS configurations that are usable by four CSI-RS antenna ports. FIG. 10(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 10(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 10(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 10(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 10(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (System InformationBlockType1) message transmission or the subframe that is configured to transmit a paging message, the CSI-RS is not transmitted.

In addition, the RE in which the CSI-RS for a certain antenna port that is belonged to an antenna port set S (S={15}, S={15,16}, S={17,18}, S={19,20} or S={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 5 exemplifies the configuration of CSI-RS subframe.

TABLE 5

| CSI-RS-SubframeCon FIG $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration in Table 5 is configured as one of the 'SubframeConfig' field and the 'zeroTxPowerSubframeConfig' field in Table 2 above. The CSI-RS subframe configuration may be separately configured for the NZP CSI-RS and the ZP CSI-RS.

The subframe including the CSI-RS satisfies Equation 12 below.

$$(10n_f + \lfloor n_s/2 \rfloor - \Delta_{CSI-RS}) \mod T_{CSI-RS} = 0 \quad \text{[Equation 12]}$$

In Equation 12, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE in which transmission mode 9 is set for a serving cell, a single CSI-RS resource may be configured in the UE. In the case of a UE in which transmission mode 10 is set for a serving cell, one or more CSI-RS resources may be configured in the UE.

For each CSI-RS resource configuration, the following parameters may be set through high layer signaling.

If transmission mode 10 is set, the CSI-RS resource configuration identifier

The number of CSI-RS ports

The CSI-RS configuration (refer to Table 3 and Table 4)

The CSI-RS subframe configuration ($I_{CSI-RS}$; refer to Table 5)

If transmission mode 9 is set, the transmission power ($P_c$) for the CSI feedback If transmission mode 10 is set, the transmission power ($P_c$) for the CSI feedback with respect to each CSI process. When the CSI subframe sets $C_{CSI,0}$ and $C_{CSI,1}$ are set by a high layer for the CSI process, $P_c$ is set in each CSI subframe set of the CSI process.

The pseudo-random sequence generator parameter ($n_{ID}$)

If transmission mode 10 is set, the QCL scrambling identifier (qcl-ScramblingIdentity-r11) for assuming the Quasi Co-Located (QCL) type B UE, the CRS port count (crs-PortsCount-r11), and the high layer parameter ('qcl-CRS-Info-r11') that includes the MBSFN subframe configuration list (mbsfn-SubframeConfig-List-r11) parameter.

When the CSI feedback value obtained by a UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information-Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration ($I_{CSI-RS}$; refer to Table 5)

The CSI-IM resource configuration is the same as one of the configured ZP CSI-RS resource configuration.

In the same subframe in a serving cell, the CSI-IM resource and the PMCH are not configured simultaneously.

For a UE in which transmission modes 1 to 9 are set, a ZP CSI-RS resource configuration may be configured in the UE for a serving cell. For a UE in which transmission mode 10 is set, one or more ZP CSI-RS resource configurations may be configured in the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration ($I_{CSI-RS}$; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and 11th OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjectEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe patter ('measSubframePattern-Neigh') for the neighbor cell measurement.

Although the measurement in the pattern for the RSRQ is not limited, but it is preferable to be measured only in the pattern for the accuracy requirement.

Massive MIMO

In a wireless communication system after LTE Release (Rel)-12, the introduction of an active antenna system (AAS) is taken into consideration.

Unlike in an existing passive antenna system in which an amplifier and an antenna in which the phase and size of a signal may be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-D beam pattern in which a beam direction and a beam width have been taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, unlike in an existing straight-line antenna array, if a 2-D antenna array is formed, a 3-D beam pattern may be formed by the active antenna of the AAS.

FIG. 11 is a diagram illustrating an example of a 2D active antenna system having 64 antenna elements to which the present invention can be applied.

As shown in FIG. 11, it is possible to consider a case where Nt=Nv·Nh antennas have a square shape with a general two-dimensional antenna arrangement.

Here, Nh denotes the number of antenna rows in the horizontal direction, and Nv denotes the number of antenna rows in the vertical direction.

If a 3-D beam pattern is used from a viewpoint of a transmission antenna, the forming of a semi-static or dynamic beam in the vertical direction of a beam in addition to the horizontal direction may be performed. For example, an application, such as the forming of a sector in the vertical direction may be taken into consideration.

Furthermore, from a viewpoint of a reception antenna, when a reception beam is formed using a massive reception antenna, an effect of a rise of signal power according to an antenna array gain may be expected. Accordingly, in the case of uplink, an eNB may receive a signal transmitted by a UE through a plurality of antennas. In this case, there is an advantage in that the UE can configure its own transmission power very low by taking into consideration the gain of a massive reception antenna in order to reduce an interference influence.

FIG. 12 illustrates a system having a plurality of transmission/reception antennas through which an eNB or a UE is capable of three-dimensional (3-D) beamforming based on an AAS in a wireless communication system to which an embodiment of the present invention may be applied.

FIG. 12 is a diagram of the aforementioned example and illustrates a 3D MIMO system using a 2-D antenna array (i.e., a 2D-AAS).

Cell Coverage of Massive MIMO

A multiple antenna system, for example, a system having N transmission antennas may perform beamforming so that received power is increased by a maximum of N times at a specific point, assuming that total transmission power is identically transmitted compared to a single antenna system.

Even an eNB having multiple antennas, a channel that transfers a CRS, a PSS/SSS, a PBCH and broadcast information does not perform beamforming in a specific direction so that all of UEs within an eNB coverage area can receive them.

In some cases, a PDSCH, that is, a channel that transfers unicast information to a specific UE, performs beamforming according to the location of a corresponding UE and link situation in order to improve transmission efficiency. That is, the transmission data stream of the PDSCH is precoded in order to form a beam in a specific direction and transmitted through multiple antenna ports. Accordingly, for example, if transmission power of a CRS and transmission power of a PDSCH are the same, received power of a precoded PDSCH beamformed toward a corresponding UE may be increased up to a maximum of N times compared to average received power of a CRS to a specific UE.

Up to now, in the LTE Rel-11 system, an eNB having a maximum of 8 transmission antennas is taken into consideration. This means that received power of a precoded PDSCH may be eight times greater than average received power of a CRS. In the future, however, if the number of transmission antennas of an eNB is 100 or more due to the introduction of a massive MIMO system, a difference between received power of a CRS and received power of a precoded PDSCH may be 100 times or more. In conclusion, due to the introduction of the massive MIMO system, the coverage area of a CRS transmitted by a specific eNB and the coverage area of a DM-RS-based PDSCH are not identical.

In particular, such a phenomenon may be significant if a difference in the number of transmission antennas between two adjacent eNBs is great. A representative example includes an example in which a macro cell having 64 transmission antennas and a micro cell (e.g., a pico cell) having a single transmission antenna neighbor each other. A UE served in an initial deployment process of massive MIMO first expects that the number of antennas may be increased from many macro cells. Accordingly, in the case of a heterogeneous network in which a macro cell, a micro cell and a pico cell are mixed, there is a great difference in the number of transmission antennas between adjacent eNBs.

For example, in the case of a pico cell having a single transmission antenna, the coverage area of a CRS and the coverage area of a PDSCH are the same.

In the case of a macro cell having 64 transmission antennas, the coverage area of a PDSCH is greater than the coverage area of a CRS. Accordingly, if initial access and handover are determined based on only RSRP or RSRQ, that is, reception quality of the CRS, at the boundary of the macro cell and a pico cell, an eNB capable of providing the best quality of the PDSCH may not be selected as a serving cell. As a simple solution for this problem, PDSCH received power of an eNB having N transmission antennas may be assumed to be N times great, but such a method is not the best solution if a case where the eNB cannot perform beamforming in all of directions as possible is taken into consideration.

Hereinafter, a CSI measurement and reporting operation method of a terminal (or UE) for reducing latency will be described.

It should be understood that the method described below may be applied not only to systems such as 3D-MIMO and massive MIMO, but also extensively to an amorphous cell environment, and the like.

First, the 3D-MIMO system will be described briefly.

The 3D-MIMO system is one of optimal transmission systems suitable for a single-cell 2D-AAS (adaptive antenna system) base station as shown in FIG. 12 based on the LTE standard (Rel-12), and the following operation may be considered.

As shown in FIG. 12, an example of configuring CSI-RS ports from an 8-by-8 (8×8) antenna array will be described. A total of 8-port (vertically precoded) CSI-RSs in a horizontal direction are configured/transmitted for each of eight antennas vertically, by configuring one precoded CSI-RS port to which UE-dedicated beam coefficients optimized for a specific target UE are applied.

Thus, the UE may perform CSI feedback for the conventional 8-port.

Finally, a BS transmits (precoded) CSI-RS 8 ports to which a vertical beam gain optimized for each individual UE (or a specific UE group) was already applied, to the UE.

Thus, since the UE measures a CSI-RS that has undergone a wireless channel, although the UE performs the same feedback scheme based on the conventional horizontal codebook, the UE may already obtain a vertical beam gain effect of a wireless channel through a CSI measurement and reporting operation regarding the (vertically precoded) CSI-RS.

In this case, a method for determining a vertical beam optimized for an individual terminal includes (1) a method of using the RRM report result based on a (vertically precoded) small-cell discovery RS (DRS) and (2) a method of receiving, by the BS, a sounding RS (SRS) of a UE in an optimal receiving beam direction and converting the receiving beam direction into a DL optimum beam direction by channel reciprocity.

If the BS determines that the direction of the UE-dedicated best V-beam has been changed due to mobility of the UE, the BS re-configures all the RRC settings related to the CSI-RS and an associated CSI process according to the conventional operation.

When the RRC reconfiguration process is performed in this manner, occurrence of latency at a RRC level (e.g., unit of tens to hundreds of ms) is inevitable.

In other words, in the network level, a target V-beam direction is divided into, for example, four directions and 8-port CSI-RSs having precoding in each V-direction are transmitted at a corresponding transmission resource position.

Also, since each UE must perform CSI measurement and reporting on a specific CSI-RS setting among the 8-port CSI-RSs, when the target V-direction is changed, the UE has no choice but to an RRC reconfiguration procedure with a network by the CSI-RS configuration to be changed.

2D Planar Antenna Array Model

FIG. 13 shows an example of a polarization-based 2D planar antenna array model.

That is, FIG. 13 illustrates an example of a 2D AAS (active antenna system) having cross-polarization.

Referring to FIG. 13, the 2D planar antenna array model may be represented by (M, N, P).

Here, M denotes the number of antenna elements having the same polarization in each column, N denotes the number of columns in the horizontal direction, and P denotes the number of dimensions of polarization.

In FIG. 13, for cross-polarization, P=2.

FIG. 14 shows an example of a model of transceiver units (TXRUs).

The TXRU model configuration corresponding to the antenna array model configuration (M, N, P) of FIG. 14 may be expressed as (MTXRU, N, P).

In this case, MTXRU means the number of TXRUs existing in the same polarization in the same row of 2D, and MTXRU<=M is always satisfied.

Also, the TXRU virtualization model is defined by a relationship between signals of the TXRUs and the signals of antenna elements.

Here, q is a transmission signal vector of M antenna elements having the same polarization in the same column, w and W represent a wideband TXRU virtualization weight vector and matrix, and x represents a signal vector of MTXRU TXRUs.

Specifically, FIG. 14A shows a TXRU virtualization model option-1 (sub-array partition model) and FIG. 14B shows a TXRU virtualization model option-2 (full connection model).

That is, the TXRU virtualization model is classified into a sub-array model and a full-connection model according to correlation between the antenna elements and the TXRU, as shown in FIGS. 14A and 14B.

Also, mapping between CSI-RS ports and TXRUs may be 1-to-1 or 1-to-many.

In the case of the massive MIMO system using a 2D-AAS antenna structure, or the like, described above with reference to FIG. 12, the UE acquires a CSI via a CSI-RS transmitted from the BS and, in order to report the obtained CSI to the BS, a large number of CSI-RS ports need to be designed.

That is, in the massive MIMO system, a new CSI-RS pattern having a larger number of ports such as a 12-port CSI-RS pattern, a 16-port CSI-RS pattern, and the like, and a configuration method are required to be considered, compared with the conventional CSI-RS pattern of 1, 2, 4, and 8 ports.

The N-port CSI-RS pattern shown in this disclosure may be interpreted to have the same meaning as an N-port CSI-RS resource.

Here, the N-port CSI-RS resource or N-port CSI-RS pattern is a resource (group) representing REs (or a group of REs) in which the CSI-RS is transmitted through N ports, and one or more N-port CSI-RS resources may be present in one subframe or a plurality of subframes.

A plurality of N-port CSI-RS resources may be represented by an N-port CSI-RS resource pool.

For example, a 4-port CSI-RS resource includes 4 REs, and an antenna port number to which a CSI-RS is transmitted is mapped to each RE.

In order to effectively support closed-loop MIMO transmission in a transmitter (e.g., BS) having a large number of transmit antenna elements (e.g., MNP), such as the massive MIMO system, a Q-port CSI-RS pattern (e.g., Q<=MNP) should be set to the terminal.

The reason for this is that the UE must support an operation of measuring the set Q-port CSI-RSs together and calculating and reporting the CSI on the basis of the set Q-port CSI-RS together.

For example, the Q-port CSI-RS set to the UE may be a non-precoded CSI-RS.

The non-precoded CSI-RS may be expressed as type A or type B.

The non-precoded CSI-RS means a CSI-RS transmitted by a transmission end, without applying beamforming thereto, and may generally have a form of transmitting each CSI-RS port having a wide beam width.

The conventional CSI-RS pattern (or CSI-RS resource) will be described further with reference to FIGS. 15 and 16.

FIG. 15 shows an example of 8 port-CSI-RS resource mapping pattern.

That is, FIG. 15 shows a transmittable resource or resource pattern of a CSI-RS having 8 antenna ports in one resource block (RB) including 12 subcarriers in the LTE(-A) system.

In FIG. 15, the differently shaded portions represent CSI-RS resources (or CSI-RS patterns 1510, 1520, 1530, 1540, and 1550), respectively.

That is, in FIG. 15, it may be seen that there are five CSI-RS resources or five CSI-RS patterns in one subframe.

Referring to FIG. 15, the CSI-RS for one port is spread over two OFDM symbols and transmitted.

Two CSI-RSs share two REs, and two CSI-RSs shared in two REs may be distinguished by using an orthogonal code.

In FIG. 15, REs represented by the numbers of '0' and '1' means two REs in which CSI-RS port 0 and 1 are transmitted.

In this disclosure, for convenience of description, the expression such as CSI-RS port 0, 1 is used. However, in order to distinguish from other types of RS such as CRS and UE-specific RS, the CSI-RS port 0, 1 may be expressed in an index form such as CSI-RS port 15, 16, and so on.

The CSI-RS may also be set to have ports 1, 2, and 4, in addition to port 8.

Referring to Table 3 and FIG. 15, common to frame structure type 1 (FDD mode) and type 2 (TDD mode) of the LTE system, the 8-port CSI-RSs have only 5 CSI-RS transmission patterns (or 5 CSI-RS resources) in one subframe.

FIG. 16 shows another example of CSI-RS resources.

That is, FIGS. 16A, 16B, and 16C show examples of 2-port, 4-port, and 8-port CSI-RS transmission patterns, respectively.

In FIGS. 16A, 16B, and 16C, the differently shaded portions represent one CSI-RS resource or one CSI-RS pattern.

Hereinafter, a method of configuring a new CSI-RS resource (or a new CSI-RS pattern) in relation to CSI-RS transmission using antenna ports more than 8 ports proposed in the present disclosure will be described in detail with reference to the related drawings.

First Embodiment

A first embodiment provides a method of configuring a new CSI-RS resource in a normal cyclic prefix (CP) and a method of mapping an antenna port number to each resource element (RE) in a CSI-RS resource.

Hereinafter, a method of configuring a new CSI-RS patter (or a new CSI-RS resource) in a massive MIMO system proposed in the present specification, using a 12-port CSI-RS pattern and a 16-port CSI-RS pattern as a typical example, and a method for mapping an antenna port number to each CSI-RS pattern will be described.

FIG. 17 shows an example of a 12-port CSI-RS resource structure proposed in this disclosure.

That is, FIG. 17 shows design of a 12-port new CSI-RS pattern (hereinafter referred to as 'new CSI-RS pattern' for convenience of description, and the method proposed in FIG. 17 may also be applied to cases other than 12-port).

In the new CSI-RS patter design, a new CSI-RS pattern including at least one of the following technical characteristic factors (1) to (3) may be designed.

The technical characteristic factors (1) to (3) will be described one by one.

(1) A new CSI-RS pattern is created in the form of combining some of legacy 1, 2, 4, and 8 port CSI-RS patterns.

New CSI-RS patterns 1710 and 1720 illustrated in FIG. 17 represent a new CSI-RS pattern designed (or created) in the form of combining one 8-port CSI-RS pattern and one 4-port CSI-RS pattern.

In this manner, in the case of limiting the new CSI-RS pattern to the form of a combination of legacy CSI-RS patterns (or legacy CSI-RS resources), legacy impact may be advantageously minimized by setting a specific ZP CSI-RS resource(s) supported by the current standard to legacy terminals.

(2) Rule for CSI-RS port numbering within new CSI-RS pattern

Rule for CSI-RS port numbering may be carried out through 1) to 3) as follows.

1) As illustrated in FIG. 17, first, port 0 and 1 (actually, a starting point of port numbering may be 15, rather than 0, using port 15, 16, etc.) may be mapped to REs corresponding to the lowest (or highest) subcarrier index.

In FIG. 17, ports 0 and 1 may be mapped to different (OFDM) symbols, and ports 0 and 1 may be CDM-ed to each other and mapped to two REs.

2) Next, ports 2 and 3 may be mapped to REs in a CSI-RS resource as follows.

When a next subcarrier index adjacent to positions of REs of the ports 0 and 1 is occupied by (i) the new CSI-RS pattern to which the port 0 and 1 are mapped and (ii) the contiguously adjacent REs is a subgroup #1 (1711) of the new CSI-RS pattern, if a subgroup #2 (1712) of the new CSI-RS pattern not adjacent to the subgroup #1 exists, ports 2 and 3 are preferentially mapped to REs corresponding to a lowest (or highest) subcarrier index of the subgroup #2.

If the port numbers are mapped to all the REs corresponding to the lowest (or highest) subcarrier index for each subgroup, ports 2 and 3 are mapped to REs corresponding to a second lowest (or highest) subcarrier index in the subframe #1 (1711) in which mapping was first started.

In this manner, port indexing is performed first by the subframes in turn, and port indexing is performed in ascending (or descending) order of subcarrier index in each subgroup.

FIG. 17 shows an example in which antenna port numbering is applied according to the rule discussed in 2).

3) Like the port numbering rule in FIG. 17, the new CSI-RS pattern may be limitedly designed to have the same number of CSI-RS ports for each subgroup.

That is, as illustrated in FIG. 17, the 12-port CSI-RS may be divided into two subgroups and each subgroup may include six CSI-RS ports.

(3) All CSI-RS ports belonging to one New CSI-RS pattern are present in L consecutive (OFDM) symbols.

In FIG. 17, it may be seen that a total of 12 CSI-RS ports are arranged in two consecutive symbols (L=2 consecutive (OFDM) symbols) for each New CSI-RS pattern.

Alternatively, a new CSI-RS pattern may be designed (or created) by combining with REs corresponding to the CSI-RS pattern Y in FIG. 17, by allowing up to L=5.

In this case, CSI-RS ports existing in the same one new CSI-RS pattern may be separated by a maximum of 4 OFDM symbols.

Thus, in this case, there may be a disadvantage that an influence of phase drift is larger in channel measurement of the UE than the new CSI-RS pattern design corresponding to L=2.

However, in the case of designing a new CSI-RS pattern using up to five consecutive OFDM symbols, flexibility of the design of the new CSI-RS pattern is increased accordingly.

Thus, using up to five consecutive OFDM symbols has the advantage of providing greater flexibility in configuring the CSI-RS at the network end.

Alternatively, a new CSI-RS pattern may be designed by combining with the REs corresponding to the CSI-RS pattern X in FIG. 17, allowing up to L=6 similarly to the case of L=5.

As described in (1) above, the new CSI-RS pattern may be limited only to a combination of legacy CSI-RS patterns, but the present invention is not limited thereto and a method for extendedly designing the new CSI-RS pattern in the form of including RE(s) other than the legacy CSI-RS pattern.

In this case, the L value described in (3) may be greater than 2, and REs without indications in FIG. 17, that is, some of the PDSCH REs, may be designed as RE(s) which belong to the new CSI-RS pattern.

In this case, since the REs are not covered by the legacy ZP (Zero Power) CSI-RS resources, a new ZP CSI-RS resource capable of covering the REs may be required to be designed together.

That is, among enhanced UEs, when a UE receives a PDSCH from a BS, a separate ZP CSI-RS resource for covering the REs occupied by the new CSI-RS pattern should be supported to enable rate matching of positions of the REs according to the new CSI-RS pattern.

That is, the UE may be set in the separate ZP CSI-RS resource from the BS through RRC signaling and apply the set ZP CSI-RS resource to PDSCH RE mapping (rate matching).

The UE, which is set in the new RS pattern designed according to the rules of (1) to (3) above (through RRC signaling), may measure CSI-RS ports corresponding to the new RS pattern simultaneously when set in the new RS pattern, and additionally set in mapping information together to calculate a CSI on the basis of the measured CSI-RS ports.

The mapping information indicates information related to in which order the CSI-RS port numbering in the new RS pattern is mapped to the antenna configuration of the actual transmission antenna.

For example, even the same 12-port CSI-RS pattern may follow a TXRU configuration in the form of FIG. 18A or a TXRU configuration in the form of FIG. 18B.

Therefore, in order to inform the UE whether the 2D antenna array form is the form of FIG. 18A or the form of FIG. 18B, the BS may inform the UE about at least one of parameters such as the number (Na) of columns of the 2D antenna array, the number (Ma) of rows, the number (P) of polarizations, and the like, through higher-layer signaling.

Here, these parameters may be included in NZP CSI-RS configuration information.

Alternatively, these parameters, basically related to CSI reporting of the UE, may be transmitted by the BS to the UE through (or in conjunction with) a specific CSI process configuration including a specific NZP CSI-RS configuration in which the corresponding new RS patter is set.

That is, the specific CSI process configuration may include 'parameters allowing the UE to recognize a specific CSI-RS port mapping pattern' such as Na, Ma, P, and the like.

FIG. 18 shows examples of a 2D antenna array model to which the method proposed in this disclosure may be applied.

For example, when the UE which receives the 12-port CSI-RS configuration from the base station is set in Na=3, Ma=2, and P=2 together, the UE performs CSI derivation on the assumption of the TXRU configuration (or CSI-RS port distribution/configuration as illustrated in FIG. 18A.

If the UE is set in Na=2, Ma=3, and P=2 together with the 12-port CSI-RS configuration, the UE performs CSI derivation on the assumption of the TXRU configuration (or CSI-RS port distribution/configuration) as illustrated in FIG. 18B.

Also, when the CSI-RS port numbering is given in the form illustrated in FIG. 17, the UE may be set such that the CSI-RS port numbers are mapped first in rows (or first in columns) in ascending order (or descending order), starting from a specific corner (e.g., the lowest left) on the TXRU configuration which may be assumed in the form of FIG. 18A or 18B.

Here, regarding different polarizations, when the 'row first (or column first)' mapping is performed, sequential mapping is performed for each polarization index at the same column (or row) index and mapping may be performed in a next column (or row) index.

Alternatively, the port numbering pattern itself may be explicitly RRC signaled in a specific form (e.g., bitmap) to the UE.

An advantage of the 12-port CSI-RS pattern of FIG. 17 is that network flexibility may be increased when it is set together with the legacy CSI-RS pattern in the same subframe.

For example, when a specific cell or TP (transport point) A transmits only '12-port new CSI-RS pattern #1" in FIG. 17, any other cell (or TP) (or the same cell or TP A additionally) may selectively transmit at least any one of the legacy 1, 2, or 4 port CSI-RS patterns in REs of an empty '12-port new CSI-RS pattern #2'.

This is because no overlap occurs between the CSI-RS patterns.

However, the design method for the 12-port CSI-RS is not limited thereto and various other additional design methods may be present.

That is, for the 12-port CSI-RS pattern, at least one of various methods as shown in FIG. 19, or the like, including FIG. 17 may be defined or set.

Also, the BS may inform the UE about which of CSI-RS patterns the UE should assume to receive a CSI-RS through higher-layer signaling and perform CSI derivation therethrough.

FIG. 19 shows another example of a 12-port CSI-RS resource mapping pattern proposed in this disclosure.

FIG. 19 shows a case where the numbers of ports of each subgroup within a new CSI-RS pattern are different.

That is, the number of ports in one subgroup is 2 and the number of ports in another subgroup is 4.

FIG. 20 shows another example of a 12-port CSI-RS resource mapping pattern proposed in this disclosure.

FIG. 20 shows a case where a new CSI-RS pattern has three subgroups and each subgroup includes 4 ports.

A method of designing a 16-port CSI-RS pattern using the port numbering application rules of (1) to (3) discussed above will be described with reference to FIGS. 21 and 22.

FIGS. 21 and 22 show examples of a 16-port CSI-RS pattern proposed in this disclosure.

Referring to FIGS. 21A and 21B, two '16-port new CSI-RS patterns' may be represented as 16-port new CSI-RS pattern #1 and 16-port new CSI-RS pattern #2, respectively.

Here, similarly, the 16-port CSI-RS pattern may be expressed or referred to as a 16-port CSI-RS resource.

As shown in FIGS. 21A and 21B, in the case 16-port, when a pattern #1 2110 and a pattern #2 2120 are simultaneously configured/transmitted in the same subframe, they may overlap in some RE positions.

Thus, preferably, when the specific cell/TP A transmits the pattern #1 of FIG. 21A, another cell/TP configure/transmits a legacy CSI-RS using positions of legacy CSI-RS patterns indicated by 'Z' and/or legacy patterns indicated by 'X' and 'Y' in the corresponding subframe, rather than configuring/transmitting another 16-port CSI-RS.

In relation to the description of (1) discussed above, one example of the CSI-RS (resource mapping) patter of FIG. 21 is a combination of two 8-port CSI-RS patterns and it may be interpreted as a case where one new CSI-RS pattern is designed.

Also, in relation to the description of (3) discussed above, one example of the CSI-RS resource mapping pattern shown in FIG. 21 is shows a case where a total of 16 CSI-RS ports for each new CSI-RS pattern are all disposed in L=2 consecutive (OFDM) symbols.

Here, since there is a disadvantage in that two new patterns cannot coexist in one subframe in FIG. 21, it may be defined/configured such that a specific (at least) one new pattern has L>2 in such a form as in FIG. 22.

Similarly, in FIG. 22, as an example of CSI-RS port numbering in FIG. 22, port numbering may be defined/configured in various forms including the above-mentioned methods (1) to (3).

For example, in FIG. 22, REs corresponding to ports 4 and 5 of new pattern #2 may be started to be mapped to ports 0 and 1.

This means a rule in which mapping is not performed in ascending order of the OFDM symbol index but ports 0 and 1 is started to be first mapped in ascending order of the sub carrier index.

Also, in another port numbering method for the new CSI-RS pattern, it may be defined/configured such that mapping is performed by first filling port indices within the same subgroup in ascending (or descending) order and mapping is subsequently performed by filling port indices within a next subframe consecutively in ascending (or descending) order, rather than port indices are assigned first by subgroups.

Also, in the example of FIG. 22, new CSI-RS patterns may be obviously designed in the form of port numbering mapping using positions of "REs used for X-indicated legacy CSI-RS patterns", instead of REs indicated by ports 4, 5, 6, 7, 12, 13, 14, and 15 of the new patter #2.

In this case, L=6 may be obtained.

Second Embodiment

A second embodiment provides a new CSI-RS resource mapping patter in an extended cyclic prefix (CP).

In the first embodiment, the embodiments assuming the case of the normal CP have been discussed based on the 12-port and 16-port new CSI-RS pattern design.

Hereinafter, in the second embodiment, the case of the extended CP in the form of including the principle of the proposed method described in the first embodiment will be described.

FIG. 23 is a view illustrating another example of a 8-port CSI-RS patter proposed in this disclosure.

In detail, FIG. 23 illustrates a transmittable patter of CSI-RS having 8 antenna ports in a subframe to which the extended CP is applied.

In FIG. 23, an orthogonal cover code (OCC)_is applied to two OFDM symbols of a CSI-RS, and two CSI-RS antenna ports are differentiated in a CDM manner.

Thus, two CSI-RSs share two REs and are distinguishably transmitted by OCCs.

In FIG. 23, the REs expressed by the numbers 0 and 1 means two REs in which CSI-RS ports 0 and 1 are transmitted.

For purposes of description, the expression such as CSI-RS port 0, 1 is used, and CSI-RS port 0, 1, etc., may be represented such as CSI-RS port 15, 16 for distinguishing from other types of RS such as CRS and other UE-specific RS.

The CSI-RSs may be configured to have 1, 2, and 4 antenna ports in addition to the 8 antenna ports.

Figure 24:
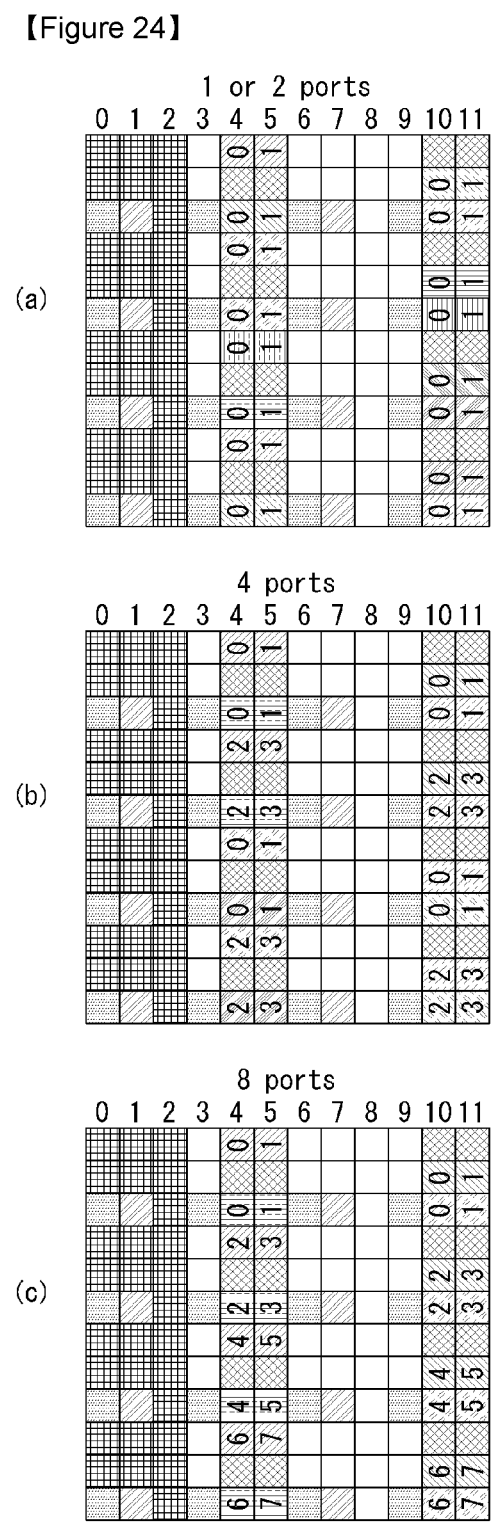

FIG. 24 shows an example of various CSI-RS patterns proposed in this disclosure.

FIG. 24 shows CSI-RS patterns for cases where CSI-RS antenna ports are 1, 2, and 4 ports in a subframe to which the extended CP is applied.

In consideration of the conventional legacy CSI-RS patter position as shown in FIG. 24, it may be seen that the CSI-RS pattern design principles such as the methods (1) to (3) described in the first embodiment (the case of normal CP) may be extendedly applied in a state in which only the legacy pattern positions are different.

For example, when 16-port new CSI-RS pattern is defined/configured in the case of the extended CP, 16 ports may be created by combining two legacy 8-port patterns in FIG. 24.

Also, the CSI-RS port numbering may be defined/configured by applying the specific port numbering rule of the first embodiment.

Of course, in configuring the 16-port CSI-RS pattern, some ports may be designed by partially combining PDSCH REs other than the legacy pattern.

In addition, in order to configure a 12-port CSI-RS pattern, the 12-port CSI-RS pattern may be defined/configured in the form of excluding four specific port positions in the 16-port CSI-RS pattern.

In this case, the four excluded port positions may be defined to match one specific legacy 4-port pattern.

The reason for defining in this manner is that the numbers of CSI-RS patterns that may be configured/transmitted by cells/TPs in the same subframe do not overlap as possible and that the CRI-RS patterns may be transmitted along with the legacy CSI-RS port pattern.

For example, it is assumed that a 16-port new CSI-RS pattern is defined by combining two legacy 8-port CSI-RS patterns in FIG. 24.

Here, a scheme of defining/configuring a 12-port new CSI-RS pattern in the form of excluding 4 RE positions corresponding to one specific 4-port legacy patter shown in FIG. 24 from the 16-port new CSI-RS pattern is applicable.

Here, there may be various methods for excluding the "one specific 4-port legacy pattern".

That is, in order to increase network flexibility, rather than defining only a 12-port pattern #1 by excluding only one specific 4-port legacy pattern, up to 12-port pattern # n may be defined by defining another 12-port pattern #2 by excluding another specific 4-port legacy pattern.

A method of selectively configuring in which number of pattern is configured by Ues, through an indicator, or the like, may also be applied.

The UE measures a channel for a CSI regarding the specific 12-port patter # i (i=1, 2, . . . , or n) set as described above and performs CSI reporting to the BS.

Third Embodiment

The third embodiment provides a method of configuring new CSI-RS resources by aggregating a plurality of (existing) CSI-RS resources.

For example, a 12-port CSI-RS resource may be configured by aggregating three 4-port CSI-RS resources.

Alternatively, a 16-port CSI-RS resource may be configured by aggregating four 4-port CSI-RS resources.

Alternatively, the 16-port CSI-RS resource may be configured by aggregating two 8-port CSI-RS resources.

In detail, a method of configuring a new CSI-RS patter proposed in the third embodiment may be defined in a form in which at least one of the principles of the following methods 1 to 4 is applied.

(1) Method 1

It is defined that a new CSI-RS (resource) is always configured in the form of multiple aggregation of specific existing X-port CSI-RS resources.

In one example, X=4 may be fixed.

When X is fixed to '4', the new CSI-RS configuration has expandability that it may be configured to 4-port, 8-port, 12-port, 16-port, 20-port and the like.

Also, when X is fixed to '2' (X=2), the new CSI-RS resource may be configured to have a port number that is a multiple of 2.

When the New CSI-RS configuration is provided in such a form that the X-port CSI-RS resources are Y multiple aggregated, a total of XY ports exists Port numbering rules for a total of XY number of antenna ports may follow the scheme of 1) option 1 or 2) option 2.

For the purposes of description, it is assumed that CSI-RS resource #1, CSI-RS resource #2, . . . , CSI-RS resource # Y are aggregated together, and port numbering in the CSI-RS resources is given 0, 1, . . . , And X−1, respectively.

Here, the port numbering in each CSI-RS resource is in the form of 15, 16, . . . , 15+X−1, and a starting point of the port number is not actually 0 and may be 15 or any other value.

1) Option 1

Port numbering for a total XY number of ports (0, 1 . . . , XY−1) may be determined as follows.

Similarly, a starting point of port number may not be 0.

Among the total of XY number of ports, {0, 1, . . . , X−1} is sequentially mapped to X number of {0, 1, . . . , X−1} ports within a CSI-RS resource #1, respectively.

Subsequently, {X, X+1, . . . , 2X−1} is sequentially mapped to X number of {0, 1, . . . , X−1} ports within a CSI-RS resource #2.

In this manner, ports are continuously sequentially connected to be mapped in ascending order (or descending order) of CSI-RS resource indices, and {(Y−1)X, (Y−1)X+

1, . . . , YX−1}, a final X number of port indices, are sequentially mapped to X number of {0, 1, . . . , X−1} port of CSI-RS resource # Y Regarding the total of mapped port indices {0, 1, . . . , XY−1}, the UE performs CSI derivation by applying a corresponding codebook through a CSI process configuration (or associated CSI feedback configuration).

2) Option 2

Port numbering for a total of XY ports (0, 1 . . . , XY−1) is determined as follows.

Among the total of XY ports, {0, 1, . . . , Y−1} are sequentially mapped to port 0s within CSI-RS resource #1, #2, . . . , # Y.

Subsequently, {Y, Y+1, . . . , 2Y−1} are sequentially mapped to port is within CSI-RS resource #1, #2, . . . , # Y.

Continued in this manner, the last Y port indices {(X−1) Y, (X−1) Y+1, . . . , XY−1} are sequentially mapped to port (X−1)x within CSI-RS resource #1, #2, . . . , # Y.

The UE performs CSI derivation by applying a corresponding codebook to the total port indices {0, 1, . . . , XY−1} as mapped through a CSI process configuration (or associated CSI feedback configuration).

(2) Method 2

In the situation in which the method 1 is applied as described above, it may be extendedly defined/configured such that, after the Y multiple X-port CSI-RS resources are aggregated, one additional A-port (0<A<X) CSI-RS resource may be further aggregated, as an exceptional additional condition.

For example, in case where X=4, Y=3 and A=2, since three 4-port CSI-RS resources are aggregated, when one 2-port CSI-RS resource is further aggregated in a total of 12-port CSI-RS state, a total of 14-port CSI-RS resources may be configured.

This is advantageous in that it is possible to add a specific A-port number that is smaller than X-port by extending from limiting to aggregation only in units of X-port CSI-RS resources.

As a result, if a 14-port CSI-RS resource is to be configured, it may be configured by including a total of four CSI-RS resources (three X-ports+one A-port CSI-RS resource).

In this case, Option 1 and Option 2 in Method 1 may be partially extended as described below.

1) Option 1'

Option 1 (or Option 2) scheme in method 1 is applied only to X-port CSI-RS resources preferentially in the same manner.

That is, {0, 1, . . . , XY−1} port is first mapped, and then, {XY, . . . , XY+A−1}, A (e.g., A=2) number of addition ports, are respectively sequentially mapped to {0, . . . , A−1}i) ports within the added A-port CSI-RS resources.

2) Option 2'

According to the option 2 scheme in the method 1, when a total of Y X-port CSI-RS resource indices are referred to as CSI-RS resource #1, #2, . . . , # Y, the added one A-port CSI-RS resource index may be referred to as #(Y+1).

Also, preferentially, the port 0s in each CSI-RS resource are mapped first in ascending (or descending) order of the CSI-RS resource index.

Next, the port is in each CSI-RS resource are mapped in ascending (or descending) order of the CSI-RS resource index, and here, if there is a specific CSI-RS resource without port 1, the corresponding port is skipped in mapping.

In this manner, every port mapping is performed by repeating the operation on the next port 2, and then on the next port 3 (as long as one CSI-RS resource index including the corresponding port remains).

(3) Method 3

The exceptional operation described in the method 2 may be generalized or extendedly applied as follows.

That is, after Y multiple X-port CSI-RS resources are aggregated, one A-port (0<A<X) CSI-RS resource may be additionally aggregated, and here, one more B-port (0<B<A) CSI-RS resource may be further aggregated.

Further, it is possible to extendedly define/configure such that CSI-RS resources of a smaller port unit may be additionally continuously set such that one C-port (0<C<B) CSI-RS resource is further aggregated in addition.

In applying the method 1, the method 2 and the method 3 described above, the CRI-RS resources denoted in the form of CSI-RS resource #1 and CSI-RS resource #2 may refer to indices to which CSI-RS resource ID on RRC signaling is assigned or refer to indices sequentially assigned by #1, #2, etc., from the front, after the CSI-RS resource IDs assigned through RRC signaling are aligned in ascending order.

Hereinafter, a method of configuring a new CSI-RS resource by aggregating a plurality of legacy CSI-RS resources and a method of performing antenna port numbering on CSI-RS RE(s) within a CSI-RS resource using a CSI-RS configuration (index) will be described in detail through a fourth embodiment.

Here, the legacy CSI-RS resource refers to 1-port, 2-port, 4-port, and 8-port CSI-RS resources, and a new CSI-RS resource refers to a CSI-RS resource regarding ports (e.g., 12-port, 16-port, etc.) greater than 8-port.

As described above, a CSI-RS resource represents a pattern of a resource in which a CSI-RS is transmitted. Generally, one X-port CSI-RS resource may include REs corresponding to the X number of ports.

Also, a plurality of CSI-RS resources may be referred to as a CSI-RS resource pool.

Fourth Embodiment

In the fourth embodiment, a method for an antenna port numbering rule for CSI-RS resources (for example, three 4-port resources in the case of 12-port and two 8-port resources in the case of 16-port) using the method 1 to the method 3 described above.

That is, the fourth embodiment provides a rule (or method or mapping) for positions of the RE(s) in which the CSI-RS is transmitted in each CSI-RS resource and the antenna port numbering for the corresponding RE(s).

That is, antenna port numbering rule may be defined/configured by applying CSI-RS configuration number (or index) related to CSI-RS RE positions to which the X antenna ports are mapped in information configured through (X-port) CSI-RS resource # i (i=0,1,2, . . . ), regardless of a CSI-RS resource ID set by the BS to the UE through RRC signaling (e.g., CSI-RS Config.).

Here, (X-port) CSI-RS resources #0, #1, #2, etc. include REs mapped to X antenna ports, respectively.

The CSI-RS configuration number (or index) indicates the 'CSI reference signal configuration', which is the leftmost column of Table 3 and Table 4 discussed above.

Here, the index of the CSI-RS configuration in Table 3 and Table 4 is information indicating a starting point of an RE in which the CSI-RS is transmitted in the CSI-RS resource.

For example, it is assumed that there are Y number of CSI-RS resources that are configured together for the UE in the same CSI process.

After the 'CSI reference signal configuration' numbers regarding the RE positions respectively indicated in CSI-RS resources are aligned in ascending order (or descending order), the antenna port numbering rule of the method 1 to method 3 is applied.

In this case, the forms of CSI-RS resources #1 and #2 represented in the above-mentioned method 1 to method 3 are not the CSI-RS resource IDs on RRC signaling but 'CSI reference signal configuration' numbers corresponding to the CSI-RS reference indices re-aligned (in ascending or descending order).

In this case, the antenna port numbering rule may be applied to each CSI-RS resource by regarding that the CSI-RS resource #1, #2, etc., correspond in order in which 'CSI reference signal configuration' numbers are set/provided on RRC signaling configuration, without an operation of aligning the 'CSI reference signal configuration' numbers in ascending (or descending) order.

For example, when X=4 (X is the number of antenna ports) and Y=3 (Y is the number of CSI-RS resources), "CSI reference signal configuration" number may be set for three (Y=3) CSI-RS resources through RRC signaling (e.g., CSI-RS Config. IE).

In this case, it is assumed that the CSI-RS configuration numbers are 2, 6, and 4, respectively.

In this case, considering that the CSI-RS resource #1, the CSI-RS resource #2, and the CSI-RS resource #3 respectively correspond to 'CSI reference signal configuration' number 2, 6, 4, in the above-described methods (Method 1 to Method 3), the aforementioned antenna port numbering rule may be applied.

An example of RRC signaling may be CSI-RS Config. IE (Information Element), and an example of a format thereof is shown in Table 6 below and the parameters of Table 6 are shown in Table 7.

TABLE 6

| | |
|---|---|
| -- ASN1START | |
| CSI-RS-ConfigNZP-r11 ::= | SEQUENCE { |
| csi-RS-ConfigNZPId-r11 | CSI-RS-ConfigNZPId-r11, |
| antennaPortsCount-r11 | ENUMERATED {an1, an2, an4, an8}, |
| resourceConfig-r11 | INTEGER (0 .. 31), |
| subframeConfig-r11 | INTEGER (0 .. 154), |
| scramblingIdentity-r11 | INTEGER (0 .. 503), |
| qcl-CRS-Info-r11 | SEQUENCE { |
| qcl-ScramblingIdentity-r11 | INTEGER (0 .. 503), |
| crs-PortsCount-r11 | ENUMERATED {n1, n2, n4, spare1}, |
| mbsfn-SubframeConfigList-r11 | CHOICE { |
| release | NULL, |
| setup | SEQUENCE { |
| subframeConfigList | MBSFN-SubframeConfigList |
| } | OPTIONAL |
| } | OPTIONAL, |
| -- Need ON | |
| } | |
| -- Need OR | |
| [[eMIMO-Info-r13 | CHOICE { |
| release | NULL, |
| setup | SEQUENCE { |
| nzp-resourceConfigList-r13 | SEQUENCE (SIZE (2 .. 8)) OF |
| ResourceConfig-r13, | |
| cdmType | ENUMERATED {cdm2, cdm4} |
| OPTIONAL -- Need OR | |
| } | |

TABLE 6-continued

| | |
|---|---|
| } | OPTIONAL |
| -- Need ON | |
| ]] | |
| } | |
| ResourceConfig-r13 ::= | INTEGER (0 .. 31) |
| -- ASN1STOP | |

TABLE 7

CSI-RS-ConfigNZP field descriptions antennaPortsCount

Parameter represents the number of antenna ports used for transmission of CSI reference signals where ani corresponds to 1, an2 to 2 antenna ports etc. see TS 36.211 [21, 6.10.5].
cdmType EUTRAN configures this field only for CSI processes that include eMIMO-Type set to nonPrecoded .
qcl-CRS-info : Indicates CRS antenna ports that is quasi co-located with the CSI-RS antenna ports, see TS 36.213 [23, 7.2.5]. EUTRAN configures this field if and only if the UE is configured with qcl-Operation set to type B.
resourceConfig : Parameter: CSI reference signal configuration, see TS 36.211 [21, table 6.10.5.2-1 and 6.10.5.2-2].
subframeConfig : Parameter: $I_{CSI-RS}$, see TS 36.211 [21, table 6.10.5.3-1].
scramblingIdentity : Parameter: Pseudo-random sequence generator parameter, $n_{ID}$, see TS 36.213 [23, 7.2.5].

The antenna port numbering method in each CSI-RS resource (#1, #2, #3, etc.) may be applied according to option 1 described above.

First, an antenna port mapped to the CSI-RS resource #1 may be (0, 1, 2, 3) or (15, 16, 17, 18), an antenna port mapped to CSI-RS resource #2 may be (4,5,6,7) or (19,20, 21,22), and an antenna port mapped to the CSI-RS resource #3 may be (8, 9, 10, 11) or (23, 24, 25, 26).

Also, positions of REs to which the antenna ports 0 (or 15), 4 (or 19), or 8 (or 23) are mapped may be determined by the CSI-RS configuration number (or index) corresponding to each CSI-RS resource.

The above-described antenna port mapping rule for each CSI-RS resource may be defined by Equation (13) below.

$$p = \begin{cases} p' + \dfrac{N_{ports}^{CSI}}{2}i & \text{for } p' \in \{15, \ldots, 15 + N_{ports}^{CSI}/2 - 1\} \\ p' + \dfrac{N_{ports}^{CSI}}{2}(i + N_{res}^{CSI} - 1) & \text{for } p' \in \{15 + N_{ports}^{CSI}/2, \ldots, 15 + N_{ports}^{CSI} - 1\} \end{cases}$$ [Equation 13]

Here, i denotes the CSI-RS resource number and may have a value of $i \in \{0,1, \ldots, N_{res}^{CSI}-1\}$.

Also, the antenna port p may be determined as $p = iN_{ports}^{CSI} + p'$ and p' may have a value of $p' \in \{15, 16, \ldots, 15+N_{ports}^{CSI}-1\}$.

Here, the specific 'CSI reference signal configuration' number (e.g., =2) may be included in the legacy CSI-RS resource configuration.

That is, according to the RRC signaling structure, a specific one (e.g., it may be the first 2 or the last 4) of the 'CSI reference signal configuration' numbers 2, 6, and 4 may be provided through information in a legacy (default) CSI-RS resource configuration RRC message (e.g., CSI-RS Config. IE).

For example, the specific CSI reference signal configuration number may be provided through resourceConfig-r11 in CSI-RS-ConfigNZP-r11 in Table 6.

Also, RRC signaling may be designed such that the other CSI reference signal configuration numbers are additionally provided to the UE as additional configuration number related information.

For example, the remaining CSI reference signal configuration numbers may be provided through nzp-resourceConfigList-r13 and resourceConfig-r13 in Table 6.

Here, the specific 'CSI reference signal configuration number (e.g., =2)' provided through the legacy (default) CSI-RS resource configuration may be first matched to the CSI-RS resource #1 or first matched to CSI-RS resource #3.

In this regard, even when the BS transmits signaling to the UE through another RRC container according to a specific RRC message delivery structure, there should be no ambiguity between the BS and the UE.

Therefore, a method by which 1-to-1 matching between the set 'CSI reference signal' numbers and the CSI-RS resource #1, #2, #3, . . . in the aforementioned methods are clearly recognized by the specific determined order (or rule) is defined.

First, a case where the specific 'CSI reference signal configuration' number provided through legacy (default) CSI-RS resource configuration (information element) is matched to the lowest CSI-RS resource index (e.g.: CSI-RS resource #1) will be described.

For example, CSI-RS resource #1 may correspond to "resourceConfig-r11INTEGER (0 . . . 31)" configuration value indicated in (legacy) "csi-RS-ConfigNZPId-r11" within a specific "CSI-Process-r11" configuration.

Also, CSI-RS resource #2 may correspond to a "ResourceConfig-r13::=INTEGER (0 . . . 31)" configuration value indicated in a first "NZP-ResourceConfig-r13" in additional configuration information expressed by "nzp-resourceConfigList-r13SEQUENCE SIZE (1 . . . 2) or (2 . . . 8)) OF NZP-ResourceConfig-r13" of "CSI-RS-ConfigNZP-EMIMO-r13".

Also, CSI-RS resource #3 may correspond to "ResourceConfig-r13::=INTEGER (0 . . . 31)" configuration value indicated in a second "NZP-ResourceConfig-r13" in the additional configuration information expressed by "nzp-resourceConfigList-r13 SEQUENCE (SIZE (1 . . . 2)) OF NZP-ResourceConfig-r13" of "CSI-RS-ConfigNZP-EMIMO-r13"

It is needless to say that the above method may be applied to the antenna port mapping method for 16-port CSI-RS resources in the same manner.

That is, the present invention may be applied to a method of mapping an antenna port to each CSI-RS resource in the structure of X=8 (X is the number of antenna ports) and Y=2 (Y is the number of CSI-RS resources) in the same manner.

Table 8 below summarizes the case where the legacy (default) described above corresponds to the first. In Table 8, the case of normal CP is taken as an example.

TABLE 8

| CSI-RS resource | CSI-RS configuration number (index) | Antenna port number | Number of CSI-RS configured 4(port), Normal subframe (k',l') | $n_s$ mod2 | RRC signaling (e.g. :CSI-IRS Config. IE) |
|---|---|---|---|---|---|
| #1 | 2 | (0,1,2,3) or (15,16,17,18) | (9,2) | 1 | resourceConfig-r11 INTEGER indicated in CSI-RS-ConfigNZPId-r11 |
| #2 | 6 | (4,5,6,7) or (1920,21,22) | (10,2) | 1 | resourceConfig-r13 INTEGER indicated in NZP-ResourceConfig-r13 |
| #3 | 4 | (8,9,10,11) or (23,24,25,26) | (9,5) | 1 | resourceConfig-r13 INTEGER indicated in NZP-ResourceConfig-r13 |

In Table 8, k' denotes a sub-carrier index in a resource block, l' denotes an OFDM symbol index in a slot, and ns denotes a slot in a subframe.

The CSI-RS configuration number (or index) in Table 8 will be referred to Tables 3 and 4 above.

Next, a case where a specific 'CSI reference signal configuration' number provided through legacy (default) CSI-RS resource configuration corresponds to the highest CSI-RS resource index (CSI-RS resource #3) will be described.

For example, the CSI-RS resource #3 in the above-mentioned methods (method 1 to method 3) may correspond to "ResourceConfig-r13::=INTEGER (0 . . . 31)" configuration value indicated in a first "NZP-ResourceConfig-r13" of the additional configuration information expressed as "nzp-resourceConfigList-r13 SEQUENCE (SIZE (1 . . . 2) or (2 . . . 8)) OF NZP-ResourceConfig-r13" of "CSI-RS-ConfigNZP-EMIMO-r13".

Also, the CSI-RS resource #2 may correspond to "ResourceConfig-r13::=INTEGER (0 . . . 31)" configuration value indicated in a second "NZP-ResourceConfig-r13" in the additional configuration information expressed by "nzp-resourceConfigList-r13SEQUENCE (SIZE (1 . . . 2)) OF NZP-ResourceConfig-r13" of "CSI-RS-ConfigNZP-EMIMO-r13".

Also, the CSI-RS resource #1 may correspond to "resourceConfig-r11 INTEGER (0.31)" configuration value indicated in (legacy) "csi-RS-ConfigNZPId-r11" within a specific "CSI-Process-r11" configuration.

Table 9 below summarizes the case where the last legacy (default) described above corresponds to the last. In Table 9, the case of normal CP is taken as an example.

TABLE 9

| CSI-RS resource | CSI-RS config-uration number (index) | Number of CSI-RS configured 4(port), Normal subframe (k',l') | $n_s$ mod2 | RRC signaling (e.g. :CSI-IRS Config. IE) |
|---|---|---|---|---|
| #1 | 6 | (10,2) | 1 | resourceConfig-r13 INTEGER indicated in NZP-ResourceConfig-r13 |
| #2 | 4 | (9,5) | 1 | resourceConfig-r13 INTEGER indicated in NZP-ResourceConfig-r13 |
| #3 | 2 | (9,2) | 1 | resourceConfig-r11 INTEGER indicated in CSI-RS-ConfigNZPId-r11 |

FIG. 25 is a flow chart illustrating an example of a method for reporting channel state information using aggregated CSI-RS resources proposed in this disclosure.

Referring to FIG. 25, the UE receives CSI-RS resource configuration information indicating resource configuration of a CSI-RS (Reference Signal) using more than 8 antenna ports, from a base station (S2510).

The CSI-RS resource configuration information may be received from the BS through high layer signaling.

In addition, the resources of the CSI-RS using more than 8 antenna ports may be configured through the aggregation of two or more legacy CSI-RS resources.

In addition, the legacy CSI-RS resource may represent resources of the CSI-RS using more than 8 antenna ports.

In addition, the resources of the CSI-RS using more than 8 antenna ports may be included in the same subframe.

In addition, the resources of the CSI-RS using more than 8 antenna ports may be included in a predetermined number of consecutive symbols.

In addition, more than 8 antenna ports may be 12 ports or 16 ports.

The antenna ports equal to or less than 8 ports may be one port, two ports, four ports, or eight ports.

In addition, the aggregated two or more legacy CSI-RS resources may be three or two resources.

The CSI-RS resource configuration information includes a plurality of legacy CSI-RS configuration values, and the plurality of legacy CSI-RS configuration values may correspond to each of the aggregated two or more legacy CSI-RS resources.

Here, the legacy CSI-RS configuration value may be a value indicating a position of a resource element in which a legacy CSI-RS resource starts.

The specific legacy CSI-RS value included in the CSI-RS resource configuration information may correspond to a legacy CSI-RS resource having the lowest index among the aggregated legacy CSI-RS resources or may correspond to legacy CSI-RS resource having the highest index.

Also, the aggregated two or more legacy CSI-RS resources may sequentially correspond to a plurality of legacy configuration values aligned in descending order or ascending order, starting from a lowest value.

Also, mapping of antenna port numbers for each resource element (RE) in the legacy CSI-RS resource may be performed according to a predetermined rule.

Here, the predetermined rule may be sequentially mapping by legacy CSI-RS resources or sequentially mapping by specific resource elements in each legacy CSI-RS resource.

For example, the two or more legacy CSI-RS resources may be CSI-RS resource #1, CSI-RS resource #2, and CSI-RS resource #3.

Here, the resource elements of the CSI-RS resource #1 may be mapped to the antenna ports 15, 16, 17 and 18, the resource elements of the CSI-RS resource #2 may be mapped to the antenna ports 19, 20, 21, and 22, and the resource elements of the CSI-RS resource #3 may be mapped to the antenna ports 23, 24, 25, and 26.

In another example, the two or more legacy CSI-RS resources may be CSI-RS resource #1 and CSI-RS resource #2.

Here, the resource elements of the CSI-RS resource #1 may be mapped to the antenna ports 15, 16, 17, 18, 19, 20, 21 and 22, and the resource elements of the CSI-RS resource #2 may be mapped to the antenna ports 23, 24, 25, 26, 27, 28, 29, and 30.

Thereafter, the UE receives a CSI-RS using more than eight ports from the BS on the basis of the received CSI-RS resource configuration information (S2520).

Thereafter, the UE measures channel state information (CSI) based on the received CSI-RS (S2530).

Thereafter, the UE reports the measured CSI to the BS (S2540).

In addition to the above-mentioned method, to which of 'CSI reference signal configuration' numbers the legacy (default) CSI-RS resource corresponds, or the like, may be defined in a different form, and such similar modifications may be understood to be included in the scope of the present invention.

The above-mentioned methods prevent a problem in that a continuous CSI-RS resource ID is not assigned in the process of reassigning CSI-RS resource IDs when an event such as reconfiguration occurs by CSI-RS resource IDs in RRC signaling.

Also, it is possible to apply the antenna port numbering based on the 'CSI reference signal configuration' numbers actually indicated among the CSI-RS resources effectively configured for the UE through the corresponding methods.

In this operation, preferably, it is assumed that the new CSI-RS pattern (or new CSI-RS resource) always performs multiple CSI-RS resource aggregation in the same subframe.

The reason for this is to minimize phase drift and the like.

In this case, it may be assumed that the 'CSI reference signal configuration' numbers are not repeatedly allocated among Y number of CSI-RS resources.

However, if the Y number of CSI-RS resources may be set over multiple subframes, two or more CSI-RS resources having the same 'CSI reference signal configuration' number may be configured.

In this case, a method of determining a secondary priority rule in ascending (or descending) order of the CSI-RS resource IDs on the RRC signaling may be considered.

General Device to which Present Invention May be Applied

FIG. 26 is a block diagram of a wireless communication device according to an embodiment of the present invention.

Referring to FIG. 26, a wireless communication system includes a base station (BS) (or eNB) 2610 and a plurality of terminals (or UEs) 2620 located within coverage of the BS 2610

The eNB 2410 includes a processor 2411, a memory 2412, and a radio frequency (RF) unit 2413. The processor 2411 implements functions, processes and/or methods proposed in FIGS. 1 through 29. Layers of radio interface protocols may be implemented by the processor 2411. The memory 2412 may be connected to the processor 2411 to store various types of information for driving the processor 2411. The RF unit 2413 may be connected to the processor 2411 to transmit and/or receive a wireless signal.

The UE 2420 includes a processor 2421, a memory 2422, and a radio frequency (RF) unit 2423. The processor 2421 implements functions, processes and/or methods proposed in above-described embodiments. Layers of radio interface protocols may be implemented by the processor 2421. The memory 2422 may be connected to the processor 2421 to store various types of information for driving the processor 2421. The RF unit 2423 may be connected to the processor 2421 to transmit and/or receive a wireless signal.

The memory 2412 or 2422 may be present within or outside of the processor 2411 or 2421 and may be connected to the processor 2411 or 2421 through various well known units. Also, the eNB 2410 and/or the UE 2420 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The method for reporting channel state information in a wireless communication system of the present invention has been described on the basis of the example applied to the 3GPP LTE/LTE-A system, but the present invention may also be applied to various wireless communication systems other than the 3GPP/LTE/LTE-A system.

What is claimed is:

1. A method for reporting a channel state information (CSI) based on CSI-reference signal (CSI-RS) to a base station (BS) in a wireless communication system, by a user equipment (UE), the method comprising:
receiving, from the base station, CSI-RS resource configuration information related to a numbering for a plurality of CSI-RS resources through a radio resource control (RRC) signaling,
wherein the CSI-RS resource configuration information includes first CSI-RS configuration information and at least one second CSI-RS configuration information;
determining numbers for the plurality of CSI-RS resources based on the received CSI-RS resource configuration information,
wherein a first CSI-RS resource among the plurality of CSI-RS resources corresponds to a first number configured in the first CSI-RS configuration information, and at least one second CSI-RS resource except the first CSI-RS resource among the plurality of CSI-RS resources corresponds to at least one second number configured in the second CSI-RS configuration information,
wherein the first CSI-RS resource among the plurality of CSI-RS resources relates to the first number, and
wherein the at least one CSI-RS resource among the plurality of CSI-RS resources relates to the at least one second number;
receiving, from the base station, the CSI-RS based on the plurality of CSI-RS resources; and
reporting, to the base station, the CSI based on the CSI-RS.

2. The method of claim 1, wherein the plurality of CSI-RS resources are aggregated to obtain total numbers for total antenna ports in subframe for the CSI-RS using more than eight antenna ports.

3. The method of claim 1, wherein the at least one CSI-RS resource sequentially corresponds to values of entries configured in the second CSI-RS configuration information.

4. The method of claim 3, wherein a k-th CSI-RS resource, which is a CSI-RS resource of a specific order, of the at least one CSI-RS resource corresponds to a value of a k-th entry, which is an entry of a specific order, configured in the second CSI-RS configuration information.

5. The method of claim 1, wherein the first CSI-RS configuration information is resourceConfig-r11 related to CSI-RS configuration indicated by csi-RS-ConfigNZPId-r11 used to identify the CSI-RS resource configuration, and the second CSI-RS configuration information is nzp-resourceConfigList-r13 related to CSI-RS resource.

6. The method of claim 1, further comprising:
determining the total numbers for the total antenna ports using CSI-RS resource number information and CSI-RS resource antenna port number information.

7. The method of claim 1, wherein the plurality of CSI-RS resources are included in a same subframe.

8. A user equipment (UE) for reporting a channel state information (CSI) based on CSI-reference signal (CSI-RS) to a base station (BS) in a wireless communication system, the UE comprising:
- a transceiver transmitting and receiving a radio signal; and
- a processor functionally connected to the RF module and controlling the UE,
- wherein the processor is configured to:
- receive, from the base station, CSI-RS resource configuration information related to a numbering for a plurality of CSI-RS resources through a radio resource control (RRC) signaling,
- wherein the CSI-RS resource configuration information includes first CSI-RS configuration information and at least one second CSI-RS configuration information,
- determine numbers for the plurality of CSI-RS resources based on the received CSI-RS resource configuration information,
- wherein a first CSI-RS resource among the plurality of CSI-RS resources corresponds to a first number configured in the first CSI-RS configuration information, and at least one second CSI-RS resource except the first CSI-RS resource among the plurality of CSI-RS resources corresponds to at least one second number configured in the second CSI-RS configuration information,
- wherein the first CSI-RS resource among the plurality of CSI-RS resources relates to the first number, and wherein the at least one CSI-RS resource among the plurality of CSI-RS resources relates to the at least one second number;
- receive, from the base station, the CSI-RS based on the plurality of CSI-RS resources; and
- report, to the base station, the CSI based on the CSI-RS.

9. The UE of claim 8, wherein the plurality of CSI-RS resources are aggregated to obtain total numbers for total antenna ports in subframe for the CSI-RS using more than eight antenna ports.

10. The UE of claim 8, wherein the at least one CSI-RS resource sequentially corresponds to values of entries configured in the second CSI-RS configuration information.

11. The UE of claim 10, wherein a k-th CSI-RS resource, which is a CSI-RS resource of a specific order, of the at least one CSI-RS resource corresponds to a value of a k-th entry, which is an entry of a specific order, configured in the second CSI-RS configuration information.

12. The UE of claim 8, wherein the first CSI-RS configuration information is resourceConfig-r11 related to CSI-RS configuration indicated by csi-RS-ConfigNZPId-r11 used to identify the CSI-RS resource configuration, and the second CSI-RS configuration information is nzp-resourceConfig-List-r13 related to CSI-RS resource.

13. The UE of claim 8, wherein the processor determines the total numbers for the total antenna ports using CSI-RS resource number information and CSI-RS resource antenna port number information.

14. The UE of claim 8, wherein the plurality of CSI-RS resources are included in a same subframe.

* * * * *